(12) United States Patent
Komaki et al.

(10) Patent No.: US 8,478,137 B2
(45) Date of Patent: Jul. 2, 2013

(54) OPTICAL RECEIVER

(75) Inventors: Kosuke Komaki, Kawasaki (JP);
Masahiro Shioda, Kawasaki (JP);
Katsumi Fukumitsu, Kawasaki (JP);
Osamu Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 352 days.

(21) Appl. No.: 13/017,874

(22) Filed: Jan. 31, 2011

(65) Prior Publication Data

US 2011/0200339 A1    Aug. 18, 2011

(30) Foreign Application Priority Data

Feb. 12, 2010   (JP) ................................. 2010-029536

(51) Int. Cl.
*H04B 10/06* (2006.01)
(52) U.S. Cl.
USPC ............ 398/208; 398/205; 398/206; 398/203
(58) Field of Classification Search
USPC ................................................. 398/202–209
See application file for complete search history.

(56) References Cited

U.S. PATENT DOCUMENTS

| | | | |
|---|---|---|---|
| 6,871,024 B2 | 3/2005 | Nishimoto et al. | |
| 7,477,848 B2 * | 1/2009 | Ooi et al. | 398/147 |
| 7,729,619 B2 | 6/2010 | Noheji et al. | |
| 7,826,752 B1 * | 11/2010 | Zanoni et al. | 398/205 |
| 7,869,715 B2 * | 1/2011 | Ooi et al. | 398/147 |
| 2008/0272943 A1 * | 11/2008 | Tanimura et al. | 341/131 |
| 2009/0060511 A1 | 3/2009 | Toyoshima et al. | |
| 2009/0208224 A1 * | 8/2009 | Kikuchi | 398/141 |
| 2009/0214226 A1 * | 8/2009 | Mizuguchi et al. | 398/202 |
| 2009/0317092 A1 * | 12/2009 | Nakashima et al. | 398/204 |
| 2010/0054759 A1 * | 3/2010 | Oda et al. | 398/202 |

FOREIGN PATENT DOCUMENTS

| | | |
|---|---|---|
| EP | 0319174 A2 | 6/1989 |
| EP | 2136487 A1 | 12/2009 |
| JP | 2002-208892 A | 7/2002 |
| JP | 2004-236097 A | 8/2004 |
| JP | 2007-60583 A | 3/2007 |
| JP | 2008-58610 A | 3/2008 |
| WO | WO-2007/141846 | 12/2007 |

OTHER PUBLICATIONS

Extended European Search Report, mailed May 30, 2011 for corresponding European Application No. 11153327.9.

(Continued)

*Primary Examiner* — Kenneth N Vanderpuye
*Assistant Examiner* — Abbas H Alagheband
(74) *Attorney, Agent, or Firm* — Fujitsu Patent Center

(57) ABSTRACT

An optical receiver includes: a waveform distortion compensator to perform an operation on digital signal representing an optical signal generated by an A/D converter to compensate for waveform distortion of the optical signal; a phase detector to generate phase information representing sampling phase of the A/D converter; a phase adjuster to generate digital signal representing an optical signal in which the sampling phase of the A/D converter is adjusted from an output signal of the waveform distortion compensator using the phase information; a demodulator to generate a demodulated signal from the output signal of the phase adjuster; a phase controller to control the sampling phase of the A/D converter; a peak detector to detect a peak value of the phase information while the sampling phase of the A/D converter is controlled by the phase controller; and a compensation controller to control the waveform distortion compensator using the peak value.

15 Claims, 22 Drawing Sheets

OTHER PUBLICATIONS

Zhou Xian et al., "Digital Timing Recovery Combined with adaptive Equalization for Optical Coherent Receivers", Communications and Photonics Conference and Exhibition, Nov. 2, 2009 pp. 1-6.

Fludger, C.R.S. et al., "Uncompensated Transmission of 86Gbit/s Polarization Multiplexed RZ-QPSK over 100km of NDSF Employing Coherent Equalisation", ECOC 2006, Th4.3.3.; 2006, pp. 33-34.

Gardner, M F. "A BPSK/QPSK Timing-Error Detector for Sampled Receivers", IEEE Trans. Commun., vol. COM-34, No. 5, May 1986, pp. 423-429.

Liu, Ling et al., "A Simple, Robust, and Wide-range Chromatic Dispersion Monitor in Coherent Receivers", OFC 2009, JWA36; Mar. 22, 2009.

Ly-Gagnon, Dany-Sebastien et al., "Coherent Detection of Optical Quadrature Phase-Shift Keying Signals With Carrier Phase Estimation", IEEE Journal of Lightwave technology, vol. 24, No. 1, Jan. 2006, pp. 12-21.

Tanimura, Takahito et al., "Digital clock recovery algorithm for optical coherent receivers operating independent of laser frequency offset", ECOC2008, Mo.3.D.2, Sep. 21, 2008, pp. 35-36.

* cited by examiner

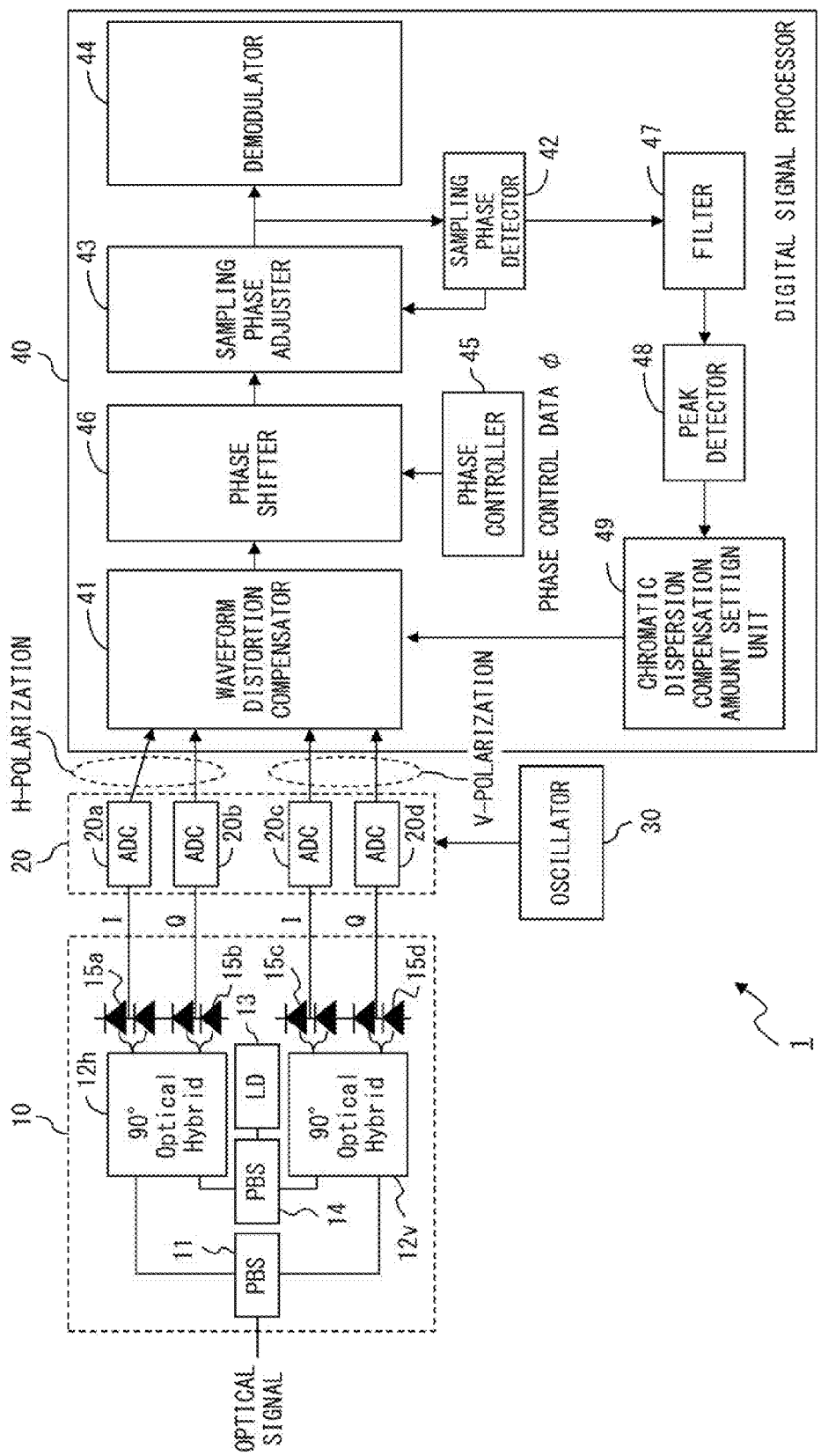
F I G. 1

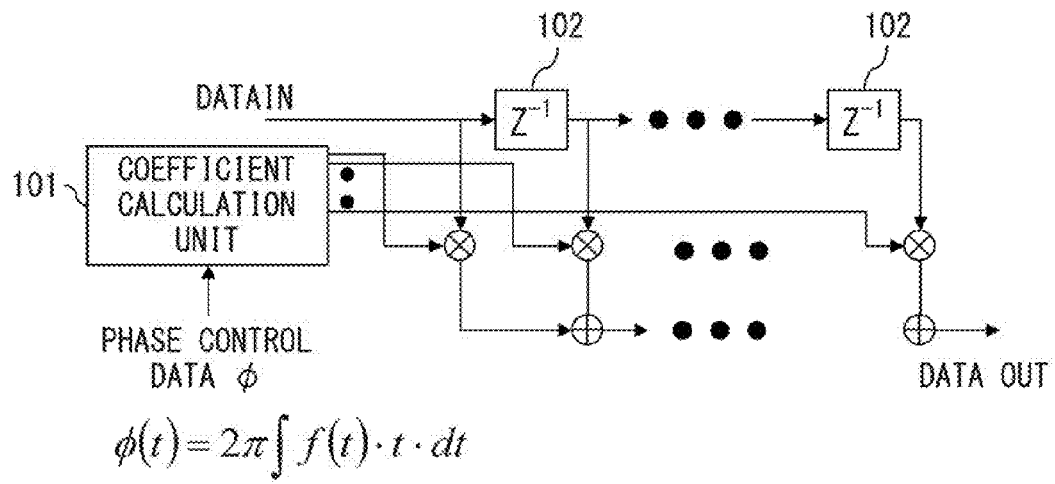
F I G. 8A
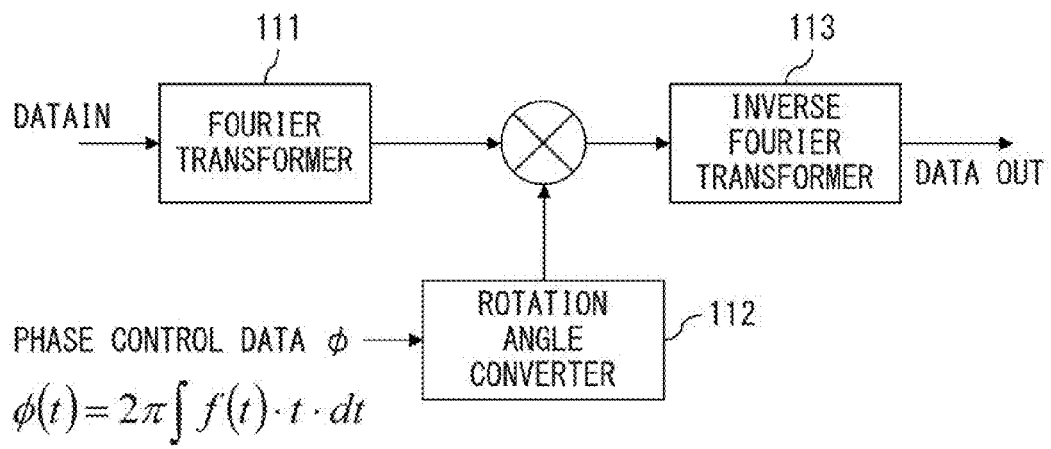
F I G. 8B

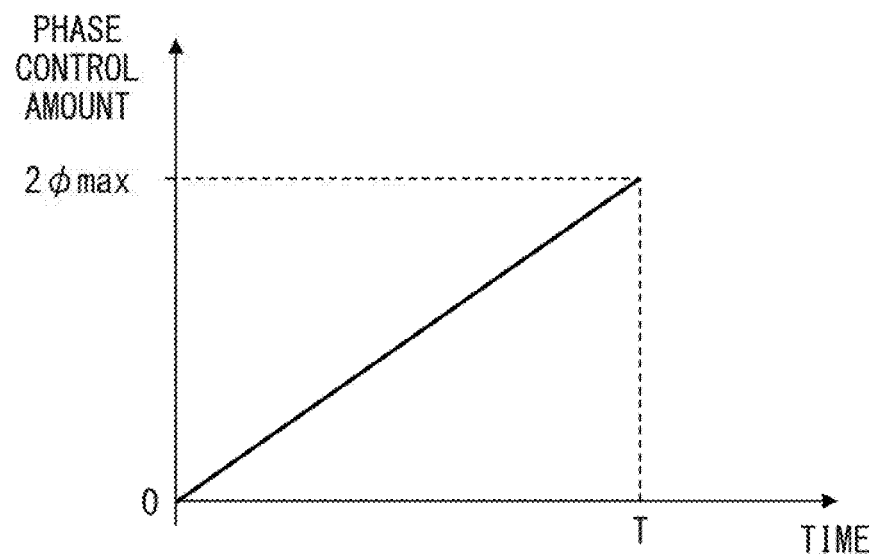
F I G. 10A
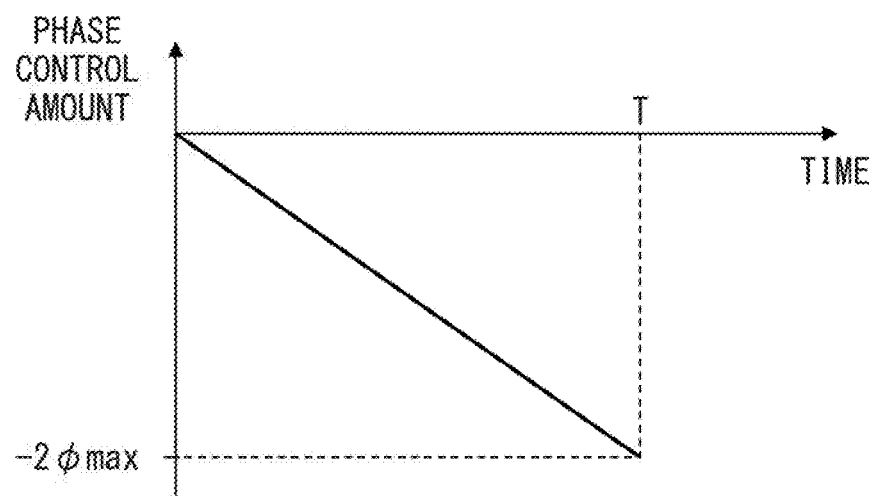
F I G. 10B

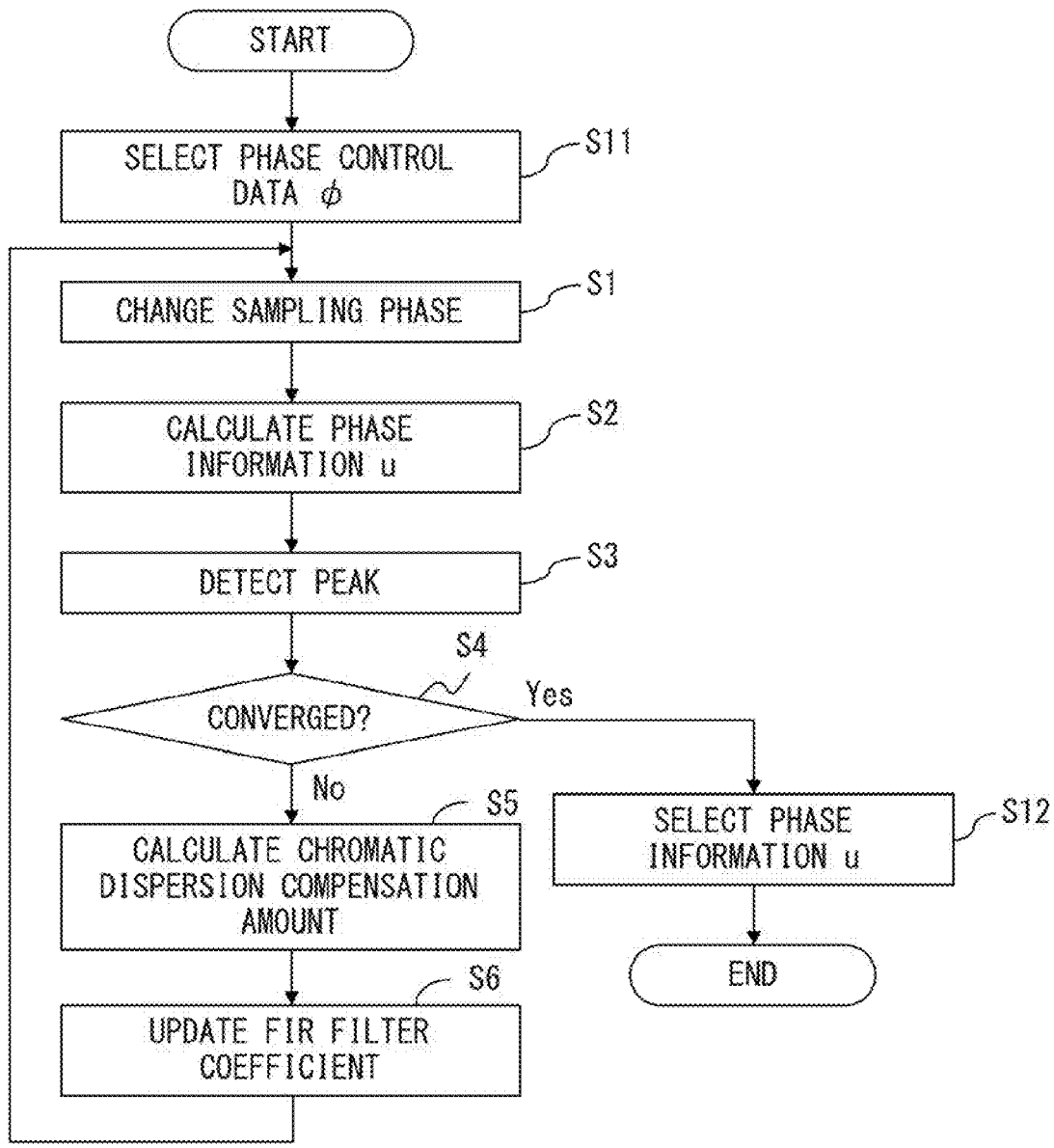
F I G. 1 2

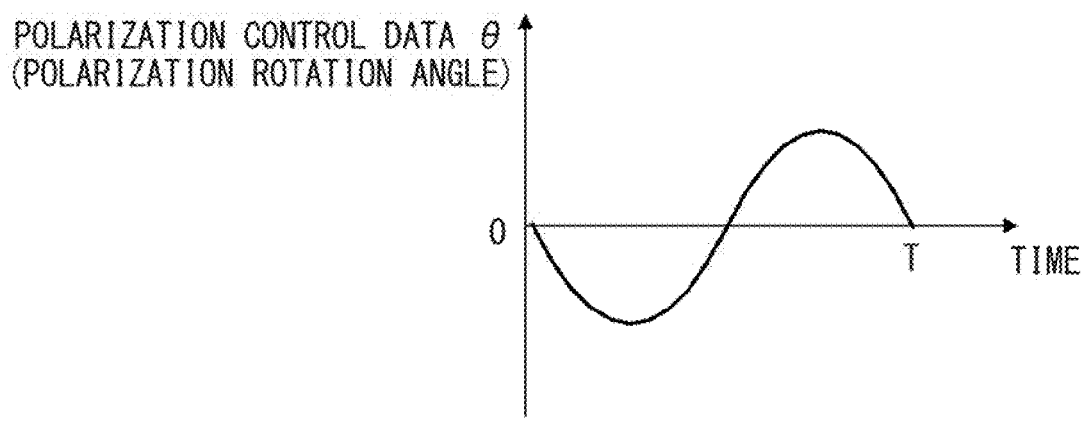
F I G. 16

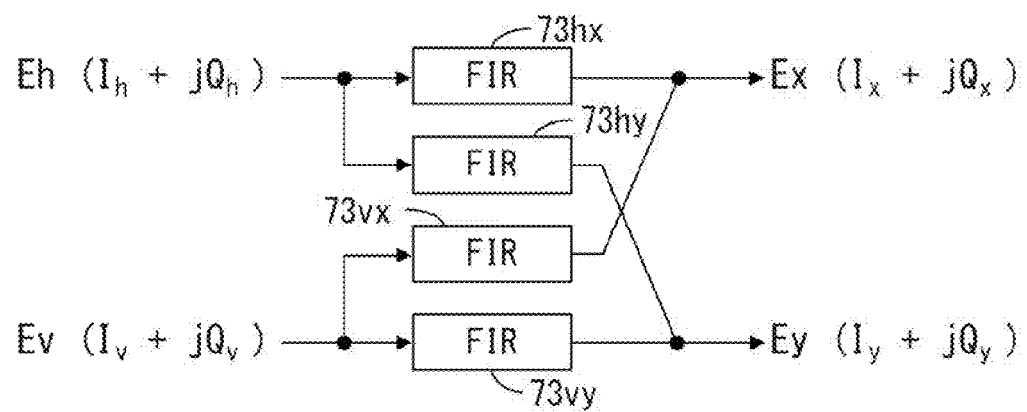
F I G. 1 7

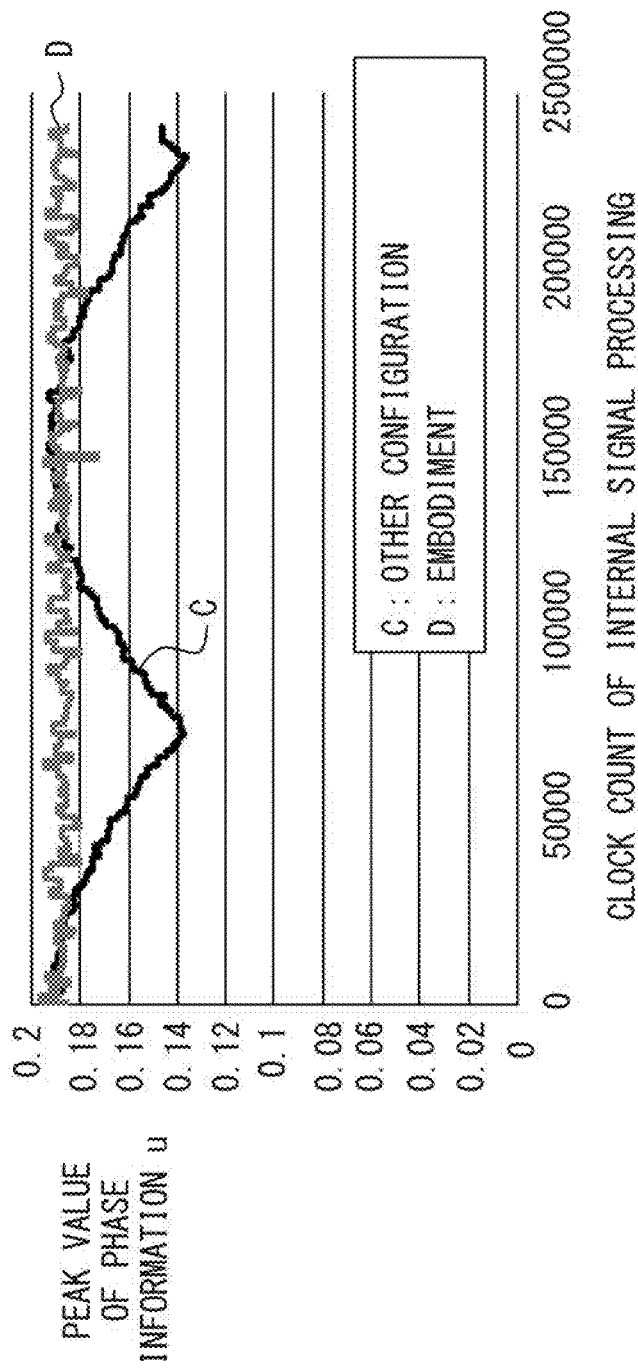
F I G. 22

OPTICAL RECEIVER

CROSS-REFERENCE TO RELATED APPLICATION

This application is based upon and claims the benefit of priority of the prior Japanese Patent Application No. 2010-029536, filed on Feb. 12, 2010, the entire contents of which are incorporated herein by reference.

FIELD

The present invention relates to an optical receiver demodulating an optical signal by utilizing digital processing, and to a digital signal processing device provided in the optical receiver.

BACKGROUND

In recent years, optical transmission systems that transmit an optical signal faster than 40 Gbit/s at a single frequency have been studied and developed. In the ultra high-speed optical transmission system, an optical signal-to-noise ratio (OSNR) is degraded, and waveform distortion is caused due to chromatic dispersion of an optical fiber and other reasons. As a technology to solve these problems, a digital coherent receiver technology has been drawing attention.

A digital coherent optical receiver includes a front-end circuit, an A/D converter, and a digital signal processing device. The front-end circuit receives an optical signal by utilizing a local optical source and generates analog electrical signals representing the optical signal. The A/D converter converts the analog electrical signal output from the front-end circuit into digital signals. The digital signal processing device demodulates the optical signal by performing digital operations on the digital signals.

The digital signal processing device includes, for example, a waveform distortion compensator that mainly compensates for chromatic dispersion and an adaptive equalizer that mainly compensates for waveform distortion caused by polarization fluctuation. In this configuration, when the chromatic dispersion is sufficiently compensated in the waveform distortion compensator, the adaptive equalizer has to compensate hardly any chromatic dispersion. As a result, the circuit size of the adaptive equalizer may be made small. Consequently, the adaptive equalizer can eliminate delay caused by its circuit size, and can also perform high-speed feedback responding to fast polarization fluctuations. For that reason, it is desirable that the chromatic dispersion is sufficiently compensated in the waveform distortion compensator.

The chromatic dispersion may be estimated and compensated by the following methods.
(1) The chromatic dispersion is estimated based on the distance of a transmission path and a characteristic of an optical fiber. In this method, however, there is a large margin of error in the estimation. Therefore the chromatic dispersion may not be sufficiently compensated.
(2) In the error correction procedure for demodulated signals, the amount of chromatic dispersion compensation is determined so that the number of error corrections is minimized. However, since this method is performed after all operations of the optical receiver (including frame synchronization) are terminated, the estimation time becomes longer. For that reason, transmission systems that have their optical paths switched at the time of failure, for example, may experience a delay in system recovery.
(3) The amount of chromatic dispersion compensation is estimated by using clock signals recovered by an analog clock recovery circuit. However, since residual dispersion is greater in analog regions, it is difficult to accurately estimate the amount of chromatic dispersion compensation.

It should be noted that methods for estimating the amount of chromatic dispersion compensation are disclosed in, for example, Japanese Patent Application Laid-Open Publication No. 2002-208892, Japanese Patent Application Laid-Open Publication No. 2004-236097, Japanese Patent Application Laid-Open Publication No. 2008-58610, and Japanese Patent Application Laid-Open Publication No. 2007-60583.

As explained above, according to the conventional arts, it has been difficult to accurately estimate chromatic dispersion in a short time in a digital coherent optical receiver. For that reason, at the time of, for example, switching optical paths that transmit optical signals, it has taken a long time to make settings for compensating chromatic dispersion of a new optical path. In other words, the time required for recovery has been long when a failure occurred in an optical transmission path.

SUMMARY

According to an aspect of an invention, an optical receiver includes: a coherent receiver to receive an optical signal; an A/D converter to convert an output signal of the coherent receiver into a digital signal representing the optical signal; a waveform distortion compensator to perform an operation on the digital signal to compensate for waveform distortion of the optical signal; a phase detector to generate phase information representing a sampling phase of the A/D converter; a phase adjuster to generate a digital signal representing an optical signal in which the sampling phase of the A/D converter is adjusted from an output signal of the waveform distortion compensator using the phase information; a demodulator to generate a demodulated signal from the output signal of the phase adjuster; a phase controller to control the sampling phase of the A/D converter; a peak detector to detect a peak value of the phase information while the sampling phase of the A/D converter is controlled by the phase controller; and a compensation controller to control the waveform distortion compensator using the peak value.

According to another aspect of an invention, an optical receiver includes: a coherent receiver to receive an optical signal; an A/D converter to convert an output signal of the coherent receiver into a digital signal representing the optical signal; a waveform distortion compensator to perform an operation on the digital signal to compensate for waveform distortion of the optical signal; a phase detector to generate phase information representing a sampling phase of the A/D converter; a phase adjuster to generate a digital signal representing an optical signal in which the sampling phase of the A/D converter is adjusted from an output signal of the waveform distortion compensator using the phase information; a demodulator to generate a demodulated signal from the output signal of the phase adjuster; a polarization controller to control a rotation angle of polarization of the optical signal; a peak detector to detect a peak value of the phase information while the polarization of the optical signal is controlled by the polarization controller; and a compensation controller to control the waveform distortion compensator using the peak value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating a configuration of an optical receiver of the first embodiment;

FIG. 8A and FIG. 8B are diagrams illustrating an embodiment of the phase shifter;

FIG. 10A and FIG. 10B illustrate embodiments of phase control data;

FIG. 12 is a flowchart representing a method for controlling the waveform distortion compensator in the second embodiment;

FIG. 16 is a diagram illustrating an embodiment of polarization control data;

FIG. 17 is a diagram illustrating an embodiment of an adaptive equalizer;

FIG. 22 is a diagram explaining the result obtained from the fourth and fifth embodiments

DESCRIPTION OF EMBODIMENTS

Figure 2:
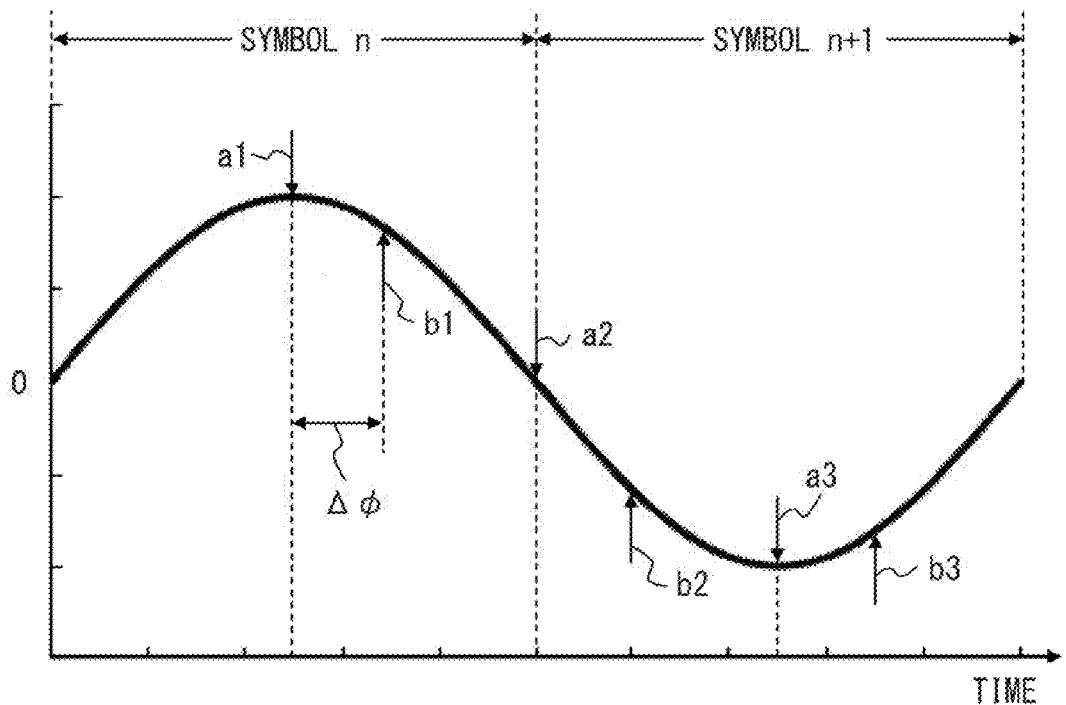
FIG. 2 is a diagram explaining the sampling phase.

FIG. 1 is a diagram illustrating a configuration of an optical receiver of the first embodiment. An optical receiver 1 of the first embodiment includes a coherence receiver 10, an A/D converter unit 20, an oscillator 30, and a digital signal processor 40.

The optical receiver 1 receives an input optical signal. The optical signal is sent from an optical transmitter and transmitted via an optical fiber and received by the optical receiver 1. The optical signal is not particularly limited, but may for example be QPSK (Quadrature Phase Shift Keying) modulated signal. In this description, QPSK includes DQPSK (Differential QPSK). The optical signal may be obtained by other modulation schemes.

The coherent receiver 10 includes a polarization beam splitter (PBS) 11, 90° optical hybrid circuits 12h and 12v, a local optical source (LD) 13, a polarization beam splitter (PBS) 14, and photo detector circuits 15a to 15d. The polarization beam splitter 11 splits the input optical signal to generate a pair of polarized optical signals h and v, which are orthogonal to each other, and guides each of the signals into the 90° optical hybrid circuits 12h and 12v, respectively. The local optical source 13 may for example be a laser diode. The local optical source 13 generates local oscillator light with the same or approximately the same frequency as the carrier frequency of the input optical signal. The local oscillator light may for example be continuous wave. The polarization beam splitter 14 splits the local oscillator light to generate a pair of local oscillator lights h and v, which are orthogonal to each other, and guides the generated lights into the 90° optical hybrid circuits 12h and 12v.

The 90° optical hybrid circuit 12h mixes the polarized optical signal h and the local oscillator light h in phase and in anti phase, to generate a pair of output lights. As a result, an H-polarization I-component optical signal and an H-polarization Q-component optical signal are generated.

The photo detector circuit 15a includes a pair of photodiodes connected in series, and converts the I-component optical signal output from the 90° optical hybrid circuit 12h into an electrical signal. Similarly, the photo detector circuit 15b converts the Q-component optical signal output from the 90° optical hybrid circuit 12h into an electrical signal. As a result, analog electrical signals representing the I-component and Q-component of H-polarization are generated.

The configurations and operations of the 90° optical hybrid circuit 12v and the photo detector circuits 15c and 15d are substantially the same as those of the 90° optical hybrid circuit 12h and the photo detector circuits 15a and 15b, respectively. In other words, analog electrical signals representing the I-component and Q-component of V-polarization are generated by the 90° optical hybrid circuit 12v and the photo detector circuits 15c and 15d.

The A/D converter unit 20 includes A/D converters 21a to 21d. Each of the A/D converters 21a to 21d converts the analog electrical signal output from each of the photo detector circuits 15a to 15d into a digital signal, respectively. As a result, digital signals representing the input optical signal are generated. It should be noted that each of the A/D converters 21a to 21d performs sampling in synchronization with the clock signal generated by the oscillator 30. The sampling frequency is not particularly limited, but may for example be twice as that of the symbol rate of the optical signal. It should be noted that the oscillator 30 may be a variable frequency oscillator.

The digital signal processor 40 includes a waveform distortion compensator 41, a sampling phase detector 42, a sampling phase adjuster 43, a demodulator 44, a phase controller 45, a phase shifter 46, a filter 47, a peak detector 48, and a chromatic dispersion compensation amount setting unit 49. It should be noted that the digital signal processor 40 may for example be realized by a processor executing a signal processing program. However, the digital signal processor 40 may include a hardware circuit.

The waveform distortion compensator 41 executes operations to compensate for waveform distortion in the optical signal on the digital signal input from the A/D converter unit 20. At that time, the waveform distortion compensator 41 compensates for waveform distortion caused by chromatic dispersion of a transmission path (i.e., optical fiber). The chromatic dispersion of the transmission path is estimated by the chromatic dispersion compensation amount setting unit 49. The waveform distortion compensator 41 compensates for waveform distortion in accordance with the chromatic dispersion compensation amount informed from the chromatic dispersion compensation amount setting unit 49.

The waveform distortion compensator 41 is not particularly limited, but may for example be realized by an FIR filter. In this case, an FIR filter is provided to each of H-polarization component and V-polarization component. The number of taps of each FIR filter is not particularly limited, but may for example be determined in accordance with the chromatic dispersion in the optical transmission system.

The chromatic dispersion compensation amount is calculated by the chromatic dispersion compensation amount setting unit 49 when the optical receiver 1 starts a receiving operation and when optical paths that transmit optical signal to be received by the optical receiver 1 are switched. The waveform distortion compensator 41 determines tap coefficients of the FIR filter in accordance with the calculated chromatic dispersion compensation amount. Afterwards, the waveform distortion compensator 41 executes a FIR filter operation while maintaining the tap coefficients until a new chromatic dispersion compensation amount is calculated. However, in addition to the above timing, the digital signal processor 40 may calculate a new chromatic dispersion compensation amount and updates the tap coefficients of the FIR filter at certain time interval or in response to an instruction from a network administrator.

The sampling phase detector 42 generates phase information indicating the sampling phase of the A/D converter unit 20. The sampling phase (or phase information) represents a timing difference between an ideal sampling timing and the actual sampling timing of the symbol phase of the transmitted signal data in the A/D converter unit 20.

FIG. 2 is a diagram explaining the sampling phase. The curve in FIG. 2 represents the analog electrical signal input to the A/D converter unit 20, and represents one of an H-polarization I-component signal, an H-polarization Q-component signal, a V-polarization I-component signal, and a V-polarization Q-component signal. FIG. 2 also illustrates an analog electrical signal of two symbols (n, n+1). It should be noted that FIG. 2 illustrates a case in which data changes between the symbols n and n+1.

When the sampling frequency is twice the symbol rate, the A/D converter unit 20 ideally samples at timings a1, a2, a3, . . . . Here, the timing a1 is the center of the symbol n, the timing a2 is a boundary between the symbols n and n+1, and the timing a3 is the center of the symbol n+1.

When the sampling timing is not properly adjusted, the A/d/converter unit 20 samples, for example, at timings b1, b2, b3, . . . . In this case, the sampling phase detector 42 detects an error Δϕ indicated in FIG. 2. The error Δϕ corresponds to the difference between the timings a1 and b1.

Figure 3A:
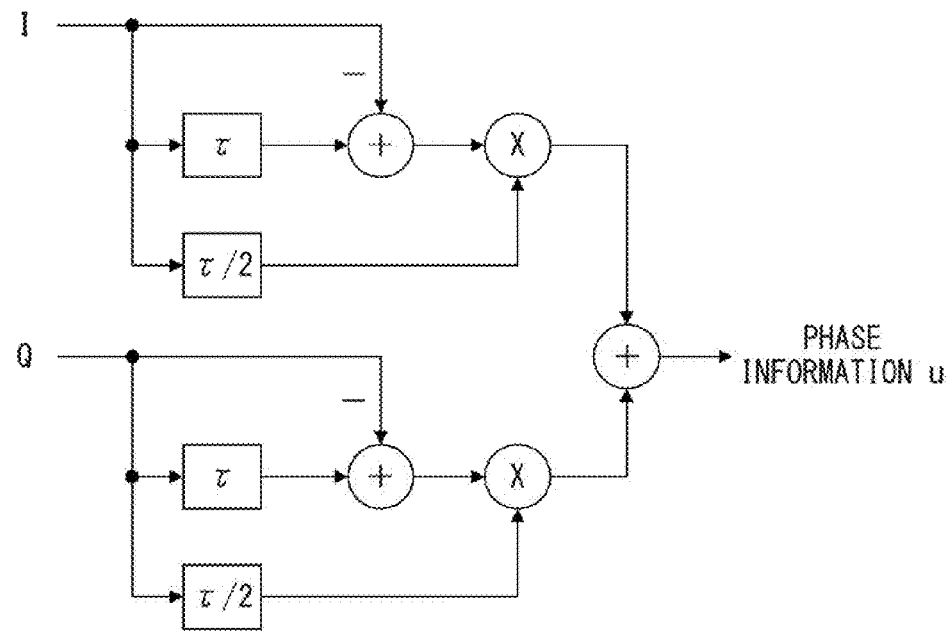
FIG. 3A is a diagram illustrating the configuration of the sampling phase detector.
Figure 3B:
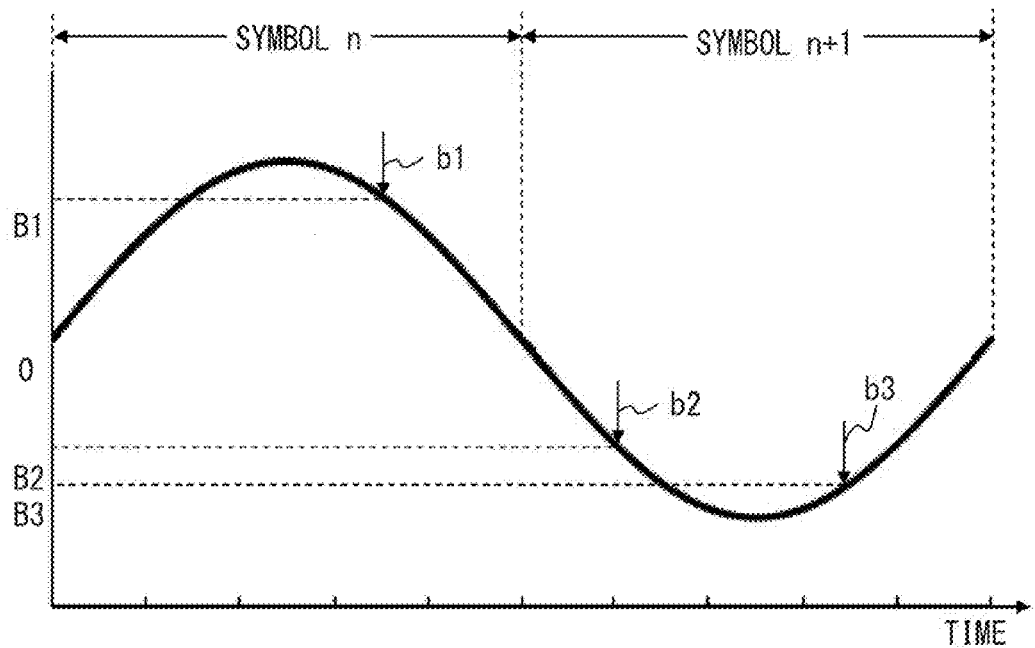
FIG. 3B is a diagram explaining the operations of the sampling phase detector.

FIG. 3A is a diagram illustrating the configuration of the sampling phase detector 42. FIG. 3B is a diagram explaining the operations of the sampling phase detector 42. The sampling phase detector 42 executes the operations illustrated in FIG. 3A. In other words, the sampling phase detector 42 executes the addition operation and the multiplication operation of each of the I-component and Q-component by using three consecutive pieces of sampled data. The sum of the operation result of the I-component and Q-component is output as phase information u. Note that τ corresponds to one symbol time period in FIG. 3A.

As an example, an I-component analog electrical signal is sampled by an A/D converter unit 20 at the timings b1, b2, and b3 illustrated in FIG. 3B. In this case, the sampling phase detector 42 is provided with sampled data B1, B2, and B3. The sampling phase detector 42 calculates "B2(B3−B1)" as I-component phase information u(i). Similarly, Q-component phase information u(q) is calculated. The sampling phase detector 42 calculates and outputs phase information u (=u(i)+u(q)). The phase information u represents the degree of the sampling phase shift and its sign. In other words, the phase information u represents the degree of the sampling timing difference and its direction.

The sampling phase detector 42 calculates the phase information u of the H-polarization component or V-polarization component. The sampling phase detector 42 may calculate the phase information u of both the H-polarization component and V-polarization component. In this case, as the phase information u, the average of the H-polarization phase information and the V-polarization phase information may for example be output.

A sampling phase detection method (or a timing difference detection method) illustrated in FIG. 3A and FIG. 3B is described for example in F. M. Gardner, A BPSK/QPSK Timing-Difference Detector for Sampled Receiver, IEEE Trans. Commun., VOL. COM-34, No. 5, May 1986, or T. Tanimura et. al, Digital Clock Recovery Algorithm for Optical Coherent Receivers Operating Independent of Laser Frequency Offset, ECOC2008, Mo. 3. D. 2. Note that the sampling phase detector 42 may detect the sampling phase by using other methods.

Figure 4:
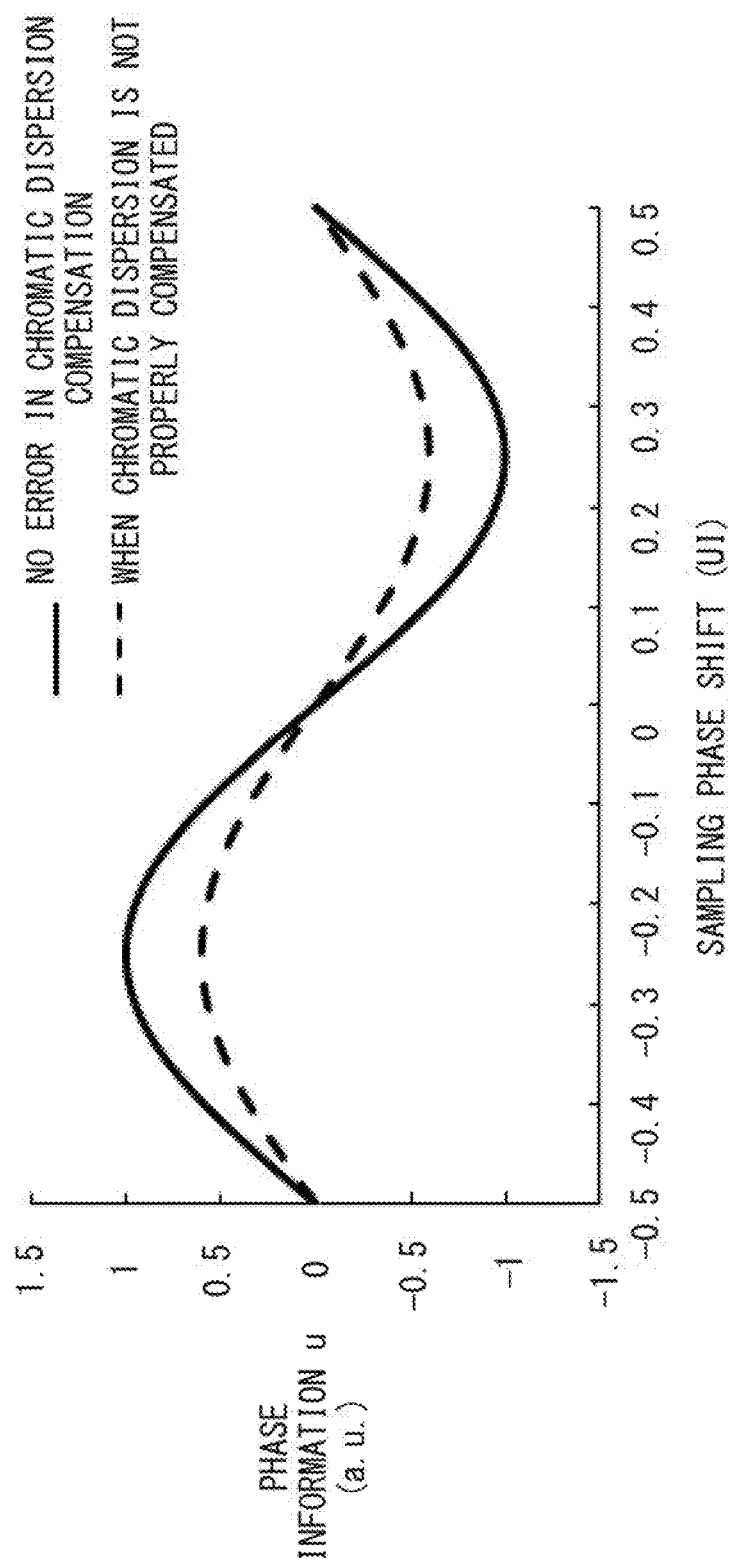
FIG. 4 is a diagram explaining the characteristics of the phase information calculated by the sampling phase detector.

FIG. 4 is a diagram explaining the characteristics of the phase information u calculated by the sampling phase detector 42. FIG. 4 illustrates the relationship between the sampling phase shift and the phase information u. The sampling phase shift is represented such that one symbol time period is "1". The phase information u is normalized with the maximum value being designated as "1" when the chromatic dispersion is ideally compensated.

The phase information u changes in accordance with the sampling phase shift (i.e., sampling timing difference) as illustrated in FIG. 4. When the sampling phase shift is zero (e.g., when the sampling is performed at the timings a1, a2, and a3 in FIG. 2), the phase information u is substantially zero. However, as the sampling phase shift becomes large, the absolute value of the phase information u becomes large. When the sampling phase shift is "0.25" or "−0.25", the absolute value of the phase information u becomes the largest. Here, the sign of the phase information u represents an "advance or delay" of the sampling timing. When the sampling phase shift becomes larger, the absolute value of the phase information u becomes smaller. When the sampling phase shift is "0.5" or "−0.5", the phase information u becomes zero. In a field in which the sampling phase shift is further increased, the phase information u exhibits periodical changes along the curve illustrated in FIG. 4. In other words, when the sampling phase shifts are, for example, "0.6", "0.7", and "0.8", the same phase information u is obtained when the sampling phase shifts are "−0.4", "−0.3", and "−0.2", respectively. When the sampling phase shifts are, for example, "−0.6", "−0.7", and "−0.8", the same phase information u is obtained when the sampling phase shifts are "0.4", "0.3", and "0.2", respectively.

The sampling phase adjuster 43 adjusts the sampling phase of the A/D converter unit 20 based on the phase information u calculated by the sampling phase detector 42. At that time, the sampling phase adjuster 43 adjusts the sampling phase of the A/D converter unit 20 so as to minimize the phase information u.

The sampling phase adjuster 43 is not particularly limited, but may be realized by a FIR filter. In this case, a FIR filter is provided to each of the H-polarization components and V-polarization components. The sampling phase is adjusted by adjusting the tap coefficients of the FIR filter based on the phase information u.

Figure 5:
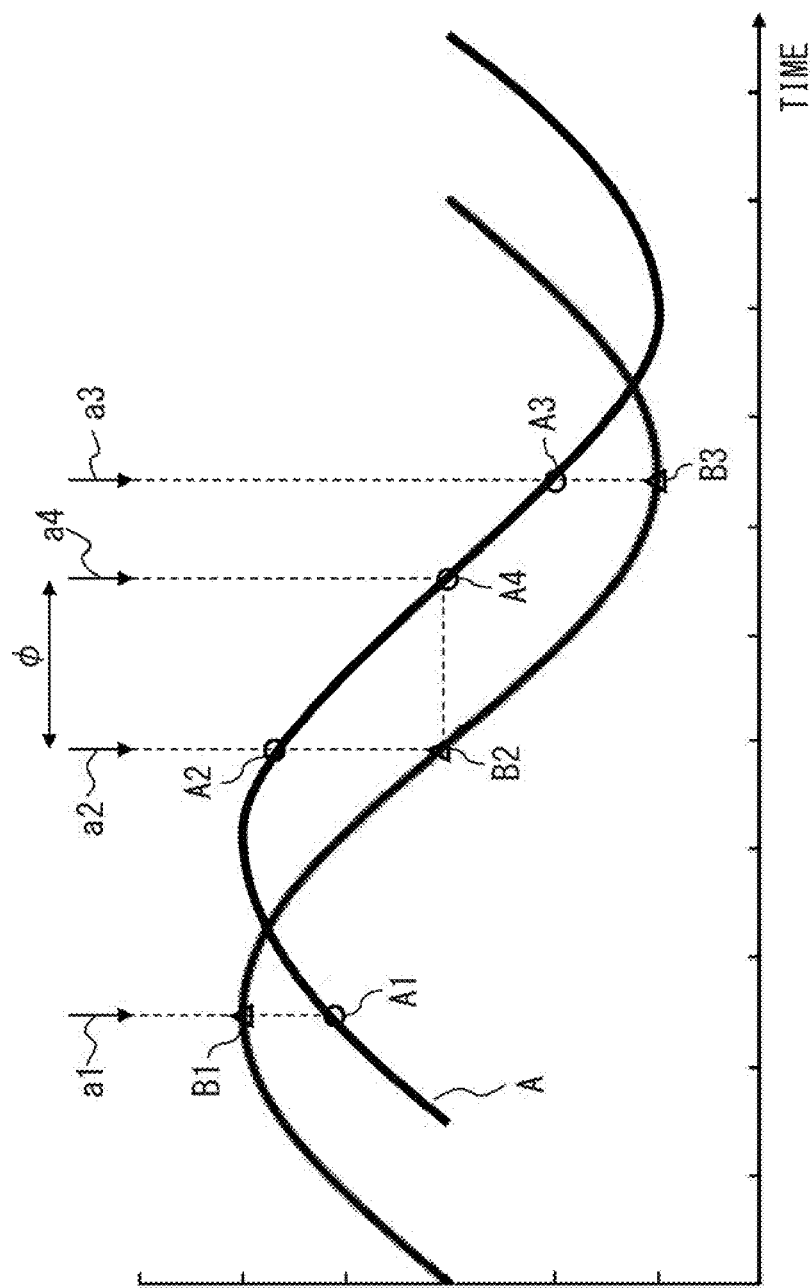
FIG. 5 is a diagram explaining a method for adjusting a sampling phase.

The sampling phase adjuster 43 adjusts the sampling phase by executing digital operations on the digital signal output from the waveform distortion compensator 41 (here, the phase shifter 46 is ignored). As illustrated in FIG. 5, for example, suppose the A/D converter unit 20 obtained data A1, A2, and A3 from an analog electrical signal A at sampling timings of a1, a2, and a3. Suppose further that the sampling phase adjuster 43 converts the data A1, A2, and A3 into data B1, B2, and B3, respectively, via digital operation using the FIR filter. In such a case, the value of the data B2, for example, is the same as the data A4 obtained from the analog electrical signal A at the timing a4. In other words, the digital operation that converts the data A1, A2, and A3 into data B1, B2, and B3, respectively, is substantially equivalent to processing of shifting the sampling timing of the A/D converter unit 20 by "$\phi$".

As described above, the sampling phase adjuster 43 adjusts the sampling timing (i.e., sampling phase) of the A/D converter unit 20. At that time, the sampling phase adjuster 43 adjusts the sampling phase based on the phase information u so that the data is sampled at the center of each symbol or at the boundary between the symbols, as illustrated in FIG. 2, for example.

The output signal of the sampling phase adjuster 43 is provided to the demodulator 44 and the sampling phase detector 42. As described above, the sampling phase detector 42 detects the sampling phase of the A/D converter unit 20. The sampling phase adjuster 43 adjusts the sampling phase by utilizing the detection result of the sampling phase detector 42.

The demodulator 44 includes an adaptive equalization waveform distortion compensator. The adaptive equalization waveform distortion compensator compensates for waveform distortion remaining in the output signal of the waveform distortion compensator 41 by executing digital operation on the output signal of the sampling phase adjuster 43. The adaptive equalization waveform distortion compensator is for example a butterfly FIR filter to compensate for waveform distortion caused by fluctuation of polarization. The demodulator 44 demodulates data from the signal in which the waveform distortion is compensated.

In the optical receiver with the above configuration, the amount of chromatic dispersion compensation that determines the tap coefficients of the FIR filter of the waveform distortion compensator 41 is calculated based on the phase information u obtained by the sampling phase detector 42. Here, the phase information u is dependent on the degree of error in the chromatic dispersion compensation as well as being dependent on the amount of the sampling phase shift, as illustrated in FIG. 4. More specifically, if the chromatic dispersion is compensated accurately, the fluctuation range of the phase information u is large with respect to the changes in the amount of the sampling phase shift. Meanwhile, when the chromatic dispersion is not properly compensated, the fluctuation range of the phase information u is small with respect to the changes in the amount of sampling phase shift, as illustrated with a broken line in FIG. 4.

The optical receiver 1 has a function to estimate the amount of chromatic dispersion based on the fluctuation range of the phase information u with respect to the amount of sampling phase shift. In the configuration illustrated in FIG. 1, this function is realized by a phase controller 45, a phase shifter 46, a peak detector 48, and a chromatic dispersion compensation amount setting unit 49. As an example, the fluctuation range of the phase information u when the amount of sampling phase shift is changed within a specified range is detected, and the amount of chromatic dispersion compensation is determined so as to maximize the fluctuation range of the phase information u.

The phase controller 45 generates phase control data $\phi$. The phase control data $\phi$ is for instructing the sampling phase. The phase control data $\phi$ is generated to sweep the sampling phase across a specified range. The phase shifter 46 shifts the sampling phase in accordance with the phase control data $\phi$. Here, the phase shifter 46 shifts the sampling phase by executing the digital operation on the digital signal output from the waveform distortion compensator 41.

Figure 6A:
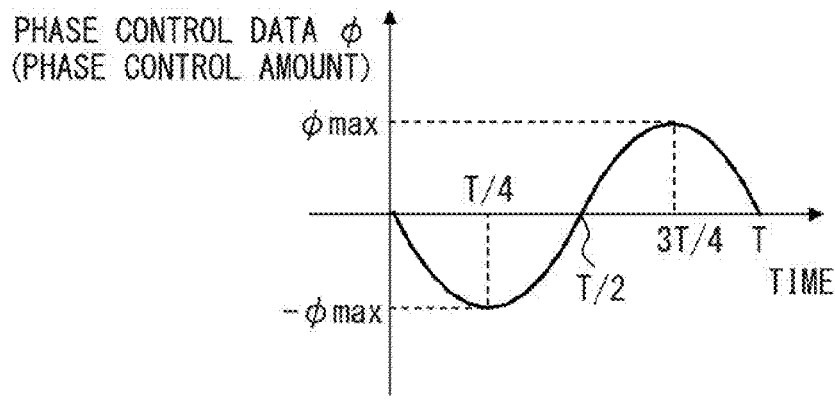
FIG. 6A illustrates an embodiment of the phase control data generated by the phase controller.
Figure 6B:
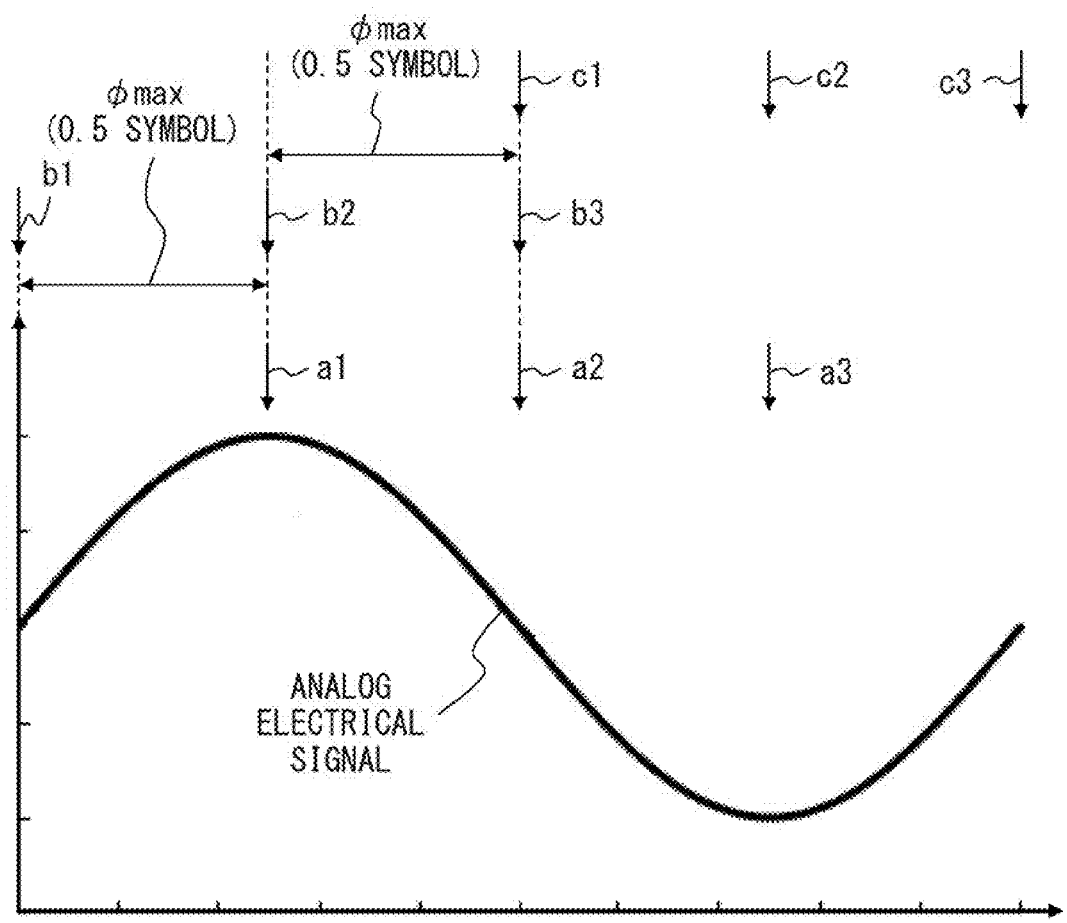
FIG. 6B is a diagram explaining the operations of the phase shifter.

FIG. 6A illustrates an embodiment of the phase control data generated by the phase controller 45. FIG. 6B is a diagram explaining the operations of the phase shifter 46. The phase control data $\phi$ is a function with respect to time, as illustrated in FIG. 6A, and is represented, for example, by a sine curve. Here, the amplitude of the phase control data $\phi$ corresponds to, for example, "one symbol time" when it is converted into the sampling timing difference. In this case, $\phi$max corresponds to 0.5 symbol time.

The phase shifter 46 shifts the sampling timing (i.e., sampling phase) in accordance with the phase control data $\phi$ illustrated in FIG. 6A. Here, at a time point 0, the A/D converter unit 20 has sampled data at the sampling timings a1, a2, and a3 illustrated in FIG. 6B. The sampling cycle of the A/D converter unit 20 assumed to be completely synchronized with the symbol rate.

At the time point T/4, the phase control data $\phi$ is "$-\phi$max (=−0.5 symbol)". The phase shifter 46 then outputs digital signals obtained when the analog electrical signals are sampled at the sampling timings b1, b2, and b3, as illustrated in FIG. 6B. In other words, during the time period from the time point 0 to the time point T/4, the sampling timing changes from "a1, a2, a3" to "b1, b2, b3" in a continuous manner. During that time period, the sampling phase detector 42 sequentially calculates the phase information u. Accordingly, the phase information u is calculated within a range such that the amount of sampling phase shift is "0 to −0.5" in FIG. 4 during the time period from the time point 0 to the time point T/4.

During the time period from the time point T/4 to the time point T/2 in FIG. 6A, the phase control data $\phi$ returns from "$-\phi$max" to "0". Accordingly, during the time period from the time point T/4 to the time point T/2, the phase information u is calculated within a range such that the amount of sampling phase shift is "−0.5 to 0" in FIG. 4.

At the time point 3T/4 in FIG. 6A, the phase control data $\phi$ is "$+\phi$max (=+0.5 symbol)". The phase shifter 46 then outputs the digital signal obtained when the analog electrical signal is sampled at the sampling timings of c1, c2, and c3, as illustrated in FIG. 6B. In other words, during the time period from the time point T/2 to the time point 3T/4, the sampling timing changes from "a1, a2, a3" to "c1, c2, c3" in a continuous manner. Accordingly, the phase information u is calculated within a range such that the amount of phase shift is "0 to 0.5" during the time period from the time point T/2 to the time point 3T/4. Similarly, the phase information u is calculated within a range such that the amount of phase shift is "0.5 to 0" during the time period from the time point 3T/4 to the time point T.

As described above, when the phase control data φ illustrated in FIG. 6A is generated by the phase controller 45, the phase shifter 46 changes the sampling phase (i.e., sampling timing) in a continuous manner within a range of ±φmax (i.e., ±0.5 symbol). That is to say, the phase controller 45 and the phase shifter 46 sweeps the sampling phase within a range of ±φmax. Then the sampling phase detector 42 sequentially calculates the corresponding phase information u during the sampling phase is swept by the phase controller 45 and the phase shifter 46. At that time, the phase information u changes in response to the sampling phase shift, as illustrated in FIG. 4. The amount of fluctuation of the sampling phase shift caused by the phase control data φ corresponds to one symbol time. In addition, the fluctuation period of the phase information u with respect to the sampling phase shift corresponds to one symbol time as explained with reference to FIG. 4. Accordingly, by controlling the sampling phase using the phase control data φ illustrated in FIG. 6A, the phase information u has at least one peak (maximum value and/or minimum value) within one cycle of the phase control data φ. In other words, the phase controller 45 generates phase control data φ that causes the phase information u to have at least one peak value. Therefore, by monitoring the peak of the phase information u over one cycle of the phase control data φ, the fluctuation range of the phase information u (e.g., the difference between the maximum value and the minimum value illustrated in FIG. 4) is detected. The function of monitoring the peak of the phase information u may be realized by the filter 47 and the peak detector 48.

It should be noted that in the above embodiment, the phase controller 45 generates phased control data φ to change (or sweep) the sampling phase within a range corresponding to the one symbol time of an optical signal. However, the phase controller 45 may generate the phase control data φ such that it changes the sampling phase within a range corresponding to a time period longer than the one symbol time. For example, φmax illustrated in FIG. 6A may be larger than 0.5 symbol time.

The filter 47 is, for example, a low-pass filter, and removes noise included in the phase information u. The filter 47 is not particularly limited, but may be realized by an averaging operation.

The peak detector 48 is realized by a peak hold circuit, for example, and detects a peak value (maximum value and/or minimum value) within one period of the phase control data φ. The peak detector 48 generates and outputs peak information based on the detection result. The peak information is, for example, the detected maximum value. Alternatively, the peak information may be the difference between the maximum value and the minimum value, or may be the sum of squares of the maximum value and the minimum value.

The chromatic dispersion compensation amount setting unit 49 estimates chromatic dispersion based on the peak information obtained by the peak detector 48, and determines the amount of chromatic dispersion compensation. The waveform distortion compensator 41 compensates for the chromatic dispersion in accordance with the amount of chromatic dispersion compensation determined by the chromatic dispersion compensation amount setting unit 49 and thereby compensates for the waveform distortion of the input signal.

Figure 7:
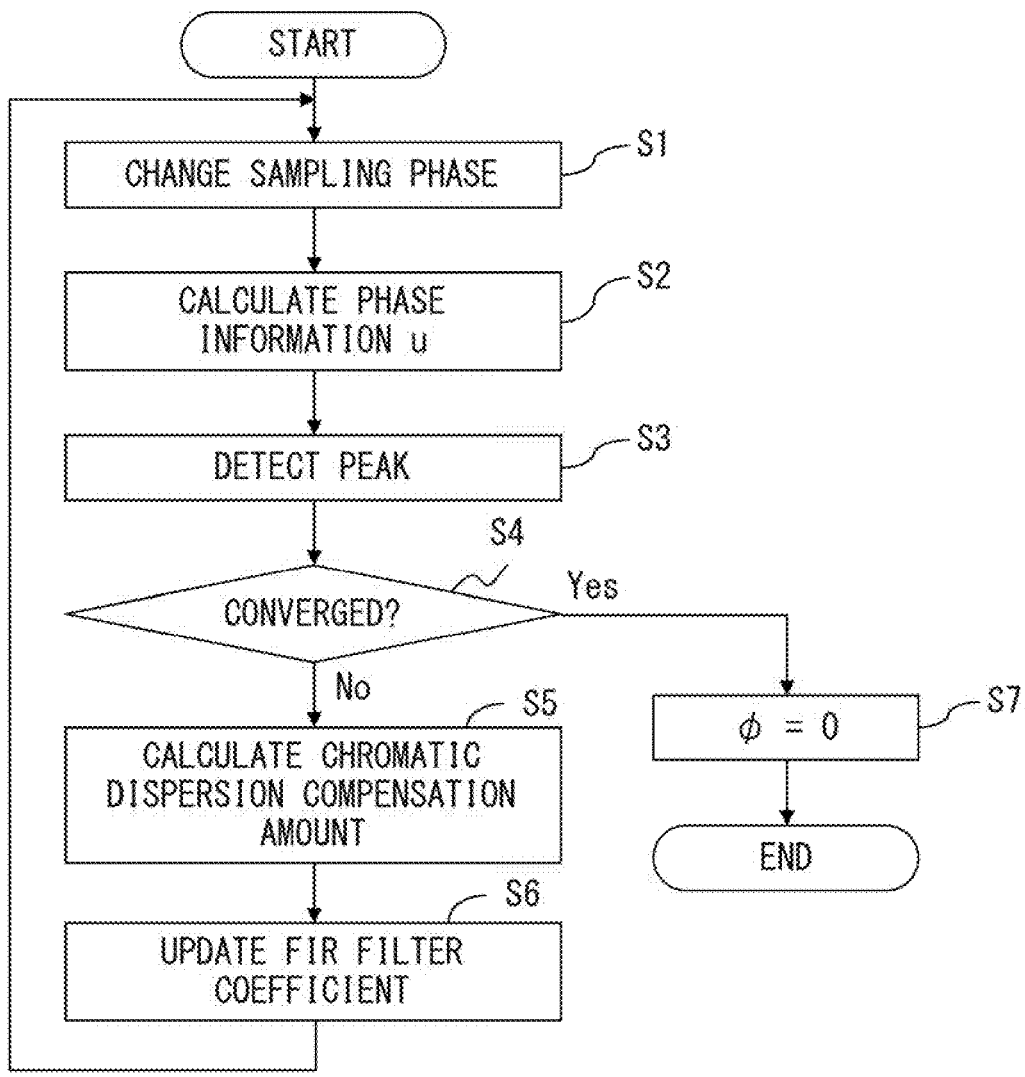
FIG. 7 is a flowchart representing a method for controlling the waveform distortion compensator in the first embodiment.

FIG. 7 is a flowchart representing a method for controlling the waveform distortion compensator 41 in the first embodiment. The processing in this flowchart is executed, for example, when the optical receiver 1 starts receiving optical signals, or when optical paths for transmitting optical signals received by the optical receiver 1 are switched. However, the processing in this flowchart may be executed regularly or may be executed in response to instructions from a network administrator.

In step S1, the phase controller 45 generates the phase control data φ illustrated in FIG. 6A. The phase shifter 46 shifts the sampling phase in accordance with the phase control data φ. As a result, the sampling phase is changed (or swept) within a range of ±φmax. In step S2, the sampling phase detector 42 detects the sampling phase by using the output signal of the sampling phase adjuster 43. The sampling phase is detected by means of a method explained in FIG. 3A and FIG. 3B, and is output as phase information u. In step S3, the peak detector 48 detects a peak value of the phase information u during a time period when the sampling phase is changed (or swept) in accordance with the phase control data φ.

Steps S1 to S3 are executed in parallel, for example. In other words, while the sampling phase is changed (or swept), the phase information u is detected, and a peak value of the phase information u is detected consequentially. While steps S1 to S6 are executed, the operation of the sampling phase adjuster 43 may be stopped.

In step S4, the chromatic dispersion compensation amount setting unit 49 checks whether the amount of chromatic dispersion compensation is converged or not. Here, as explained with reference to FIG. 4, the peak value of the phase information u becomes small if the chromatic dispersion is not properly compensated, and the peak value of the phase information u becomes large if the chromatic dispersion is properly compensated. Accordingly, when the peak value of the phase information u exceeds a threshold level, the chromatic dispersion compensation amount setting unit 49 determines that the amount of chromatic dispersion compensation is converged on a desired value.

If the amount of chromatic dispersion compensation is not converged, in step S5, the chromatic dispersion compensation amount setting unit 49 calculates a new amount of chromatic dispersion compensation based on the peak value of the phase information u obtained in step S3. At that time, the chromatic dispersion compensation amount setting unit 49 controls the amount of chromatic dispersion compensation so as to increase the peak value of the phase information u. In step S6, the waveform distortion compensator 41 updates the tap coefficients of the FIR filter based on the newly calculated amount of chromatic dispersion compensation. Here, the correspondence between the amount of chromatic dispersion compensation and the filter coefficients may be determined in advance by simulation and stored in a memory. In such a case, the waveform distortion compensator 41 obtains the filter coefficients corresponding to the new amount of chromatic dispersion compensation from the memory. The waveform distortion compensator 41 compensates for waveform distortion by using the updated filter coefficients.

The processing in steps S1 to S6 is repeatedly executed until the peak value of the phase information u exceeds the threshold level. However, when the processing in steps S1 to S6 is repeated a specified number of times, the processing for determining the amount of chromatic dispersion compensation may be terminated.

If the peak value of the phase information u exceeds the threshold level (step S4; Yes), then in step S7, the phase controller 45 sets the phase control data φ to zero. Afterwards, the phase shifter 46 stops the operation to shift the sampling phase. In other words, the output signal of the waveform distortion compensator 41 is transmitted to the sampling phase adjuster 43 without undergoing any processing.

With the above procedures, the amount of chromatic dispersion compensation is determined, and is set to the waveform distortion compensator 41. Afterwards, the chromatic dispersion of optical transmission paths is properly compensated. The sampling phase adjuster 43, afterwards, adjusts the sampling phase of the A/D converter unit 20. The adaptive equalization waveform distortion compensator in the demodulator 44, afterwards, compensates for waveform distortion caused by polarization fluctuation.

FIG. 8A and FIG. 8B are diagrams illustrating an embodiment of the phase shifter 46. In the example illustrated in FIG. 8A, the phase shifter 46 is realized by a FIR filter. In this case, a coefficient calculation unit 101 generates tap coefficients corresponding to phase control data φ. The delay time of each delay element 102 corresponds to the sampling period of the A/D converter unit 20. It should be noted that the method for shifting the sampling phase by using a FIR filter may be the same as the method explained with reference to FIG. 5.

In the example illustrated in FIG. 8B, an input signal sequence DATAIN is converted into a frequency domain signal by a Fourier transformer 111. The phase control data φ is converted into a rotation factor by a rotation angle converter 112. Here, the rotation factor Ck is represented by the following equations.

$$Ck = \exp(j*2\pi*fk*SS\_PHASE\_COMPENSATION\_NUM)$$

$$fk = k*SamplingRate/FFT\_size$$

$$k = 0 \sim FFT\_size/2, -FFT\_size/2+1 \sim -1$$

The frequency domain signal is multiplied by the rotation factor Ck. Afterwards, the multiplication result is converted into a time domain signal by an inverse Fourier transformer 113.

Figure 9:
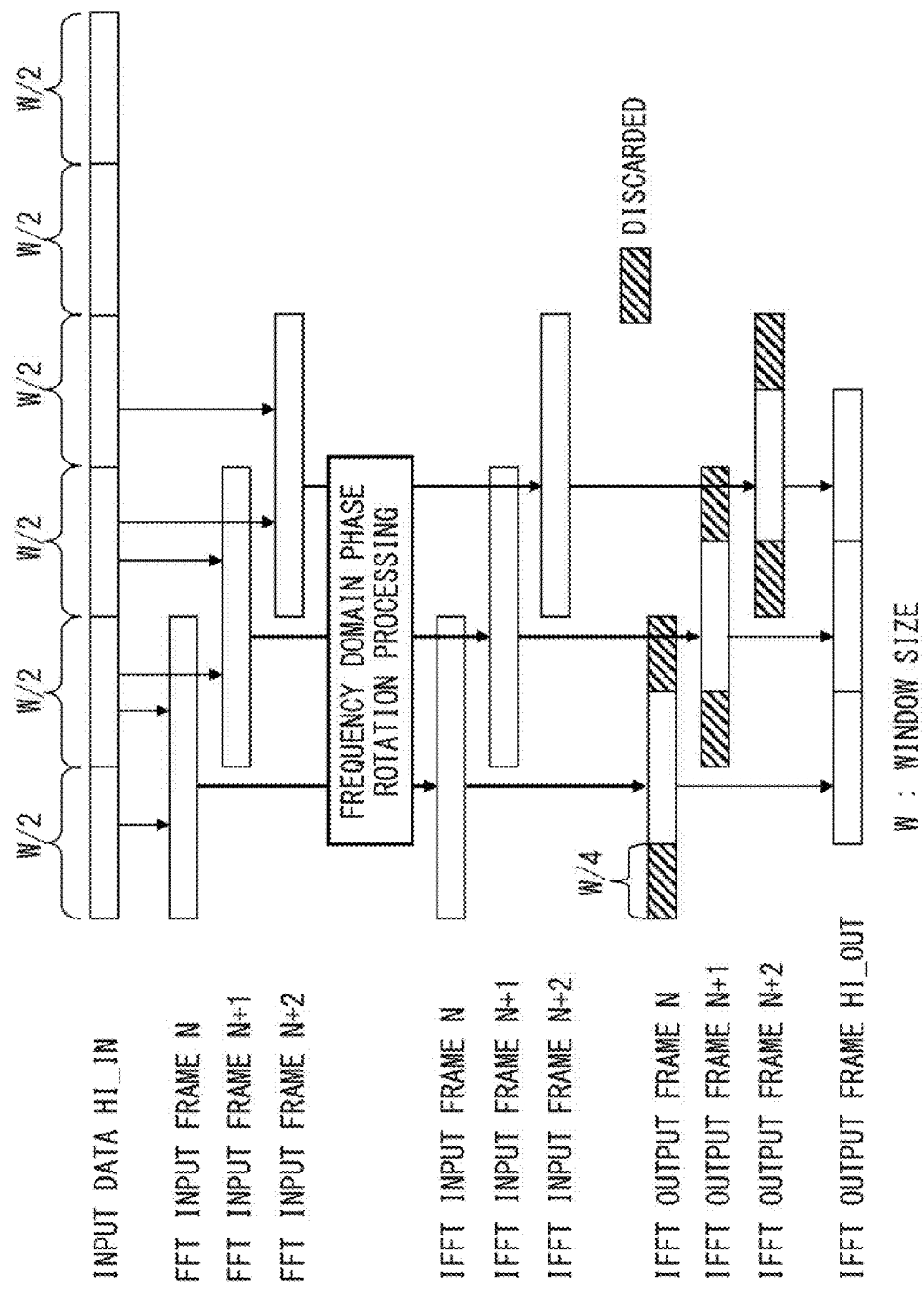
FIG. 9 illustrates an example of a method for shifting the sampling phase by using FFT/IFFT.

FIG. 9 illustrates an example of methods for shifting the sampling phase by using FFT/IFFT. In this example, three frames N to N+2 generated from the signal sequence DATAIN are input to the Fourier transformer 111. The data length of each frame corresponds to the window size of FFT. The second half of the frame N and the first half of the frame N+1 overlap with each other, and the second half of the frame N+1 and the first half of the frame N+2 overlap with each other. After each of the frames N to N+2 are converted into a frequency domain signal, frequency domain phase rotation processing is executed on the frequency domain signals. The frequency domain phase rotation processing corresponds to the sampling phase compensation processing.

Each of the frames N to N+2 that underwent the frequency domain phase rotation processing is converted into a time domain signal by the inverse Fourier transformer 113. From each of the frames N to N+2 obtained by the inverse Fourier transformation, a central portion is extracted and output.

In the above description, the phase control data φ is represented by a sine curve illustrated in FIG. 6A, but the optical receiver of the embodiment is not limited to this mode. In other words, the phase control data φ may be realized by any function as represented in the following formula.

$$\phi(t) = 2\pi \int f(t) \cdot t \cdot dt$$

The phase control data φ may be represented by a monotonically increasing function. In an example illustrated in FIG. 10A, the phase control data φ is represented as f(t)=f (f is a positive constant). The phase control data φ may be represented by a monotonically decreasing function. In an example illustrated in FIG. 10B, the phase control data φ is represented as f(t)=−f. In both cases, 2φmax is determined so as to correspond to one symbol time (or a time period longer than the one symbol time).

The sampling clock frequency of the A/D converter unit 20 in general does not completely match the symbol rate of data (or frequency N times the symbol rate). For example, difference of ±tens of ppm in a reference clock between a transmitter and a receiver is allowable. For that reason, even if the phase control data φ is zero (i.e., even if the phase shifter 46 is stopped), the amount of sampling phase shift fluctuates. As a result, the phase information u also fluctuates. For example, if the symbol rate of the data is 30Gsymbol/s, the fluctuation in the frequency of the phase information u due to frequency offset is approximately 0 to 2 MHz.

For that reason, when the phase control data φ illustrated in FIG. 10A or FIG. 10B is used, if the fluctuation in the frequency of the phase information u due to the frequency offset and frequency of the function f are in proximity to one another, even if the phase control data φ is provided to the phase shifter 46, the sampling phase shift may hardly change. In such a case, if the sampling phase is shifted by using the phase control data φ, the phase information u does not have the peak.

In order to prevent this problem, both a procedure to detect the peak value of the phase information u by changing the sampling phase with the phase control data φ represented in FIG. 10A and a procedure to detect the peak value of the phase information u by changing the sampling phase with the phase control data φ represented in FIG. 10B may be executed. Alternatively, in addition to the above two procedures, a procedure to detect the peak value of the phase information u by setting the phase control data φ to zero may be executed. Given that the bandwidth of the output noise of the phase detector 42 is 0 to 2 MHz, and the cutoff frequency of the filter (LPF) 47 is approximately 3 MHz, a value corresponding to 1 MHz may be selected as "f". In this case, the peak of the phase information u is detected in approximately 1 microsecond.

As described above, according to the first embodiment, in a procedure of estimating chromatic dispersion by using the relationship between the sampling phase shift and the phase information u, the sampling phase is forcibly changed to monitor a peak value of the phase information u. For that reason, the peak value of the phase information u is accurately detected within a short time period. The amount of chromatic dispersion compensation is determined based on the detected peak value of the phase information u, and the waveform distortion compensator 41 compensates for waveform distortion in accordance with the amount of chromatic dispersion compensation. Consequently, even if optical paths are switched because of a failure or other causes, chromatic dispersion of a new optical path is immediately estimated, and settings for compensating for the chromatic dispersion would be completed within a short time period, and thereby the time required for failure recovery is reduced.

For example, when the period of the phase control data φ is approximately 1 microsecond, and processing in steps S1 to S6 is repeated 10 times until the amount of chromatic dispersion compensation is converged in the flowchart of FIG. 7, setting to compensate for the chromatic dispersion is completed in ten to several tens of microseconds. In this case, the switching time sufficiently satisfies the switching time provided in OUPSR (Optical Unidirectional Path Switched Ring).

According to the first embodiment, since the sampling phase is controlled so that the phase information u passes the peak point, even in a case in which the sampling frequency of the A/D converter unit 20 and the symbol rate do not match, or in a case in which the oscillation frequency of the local oscillator 13 fluctuates, the peak value of the phase information u is stably detected.

Figure 11:
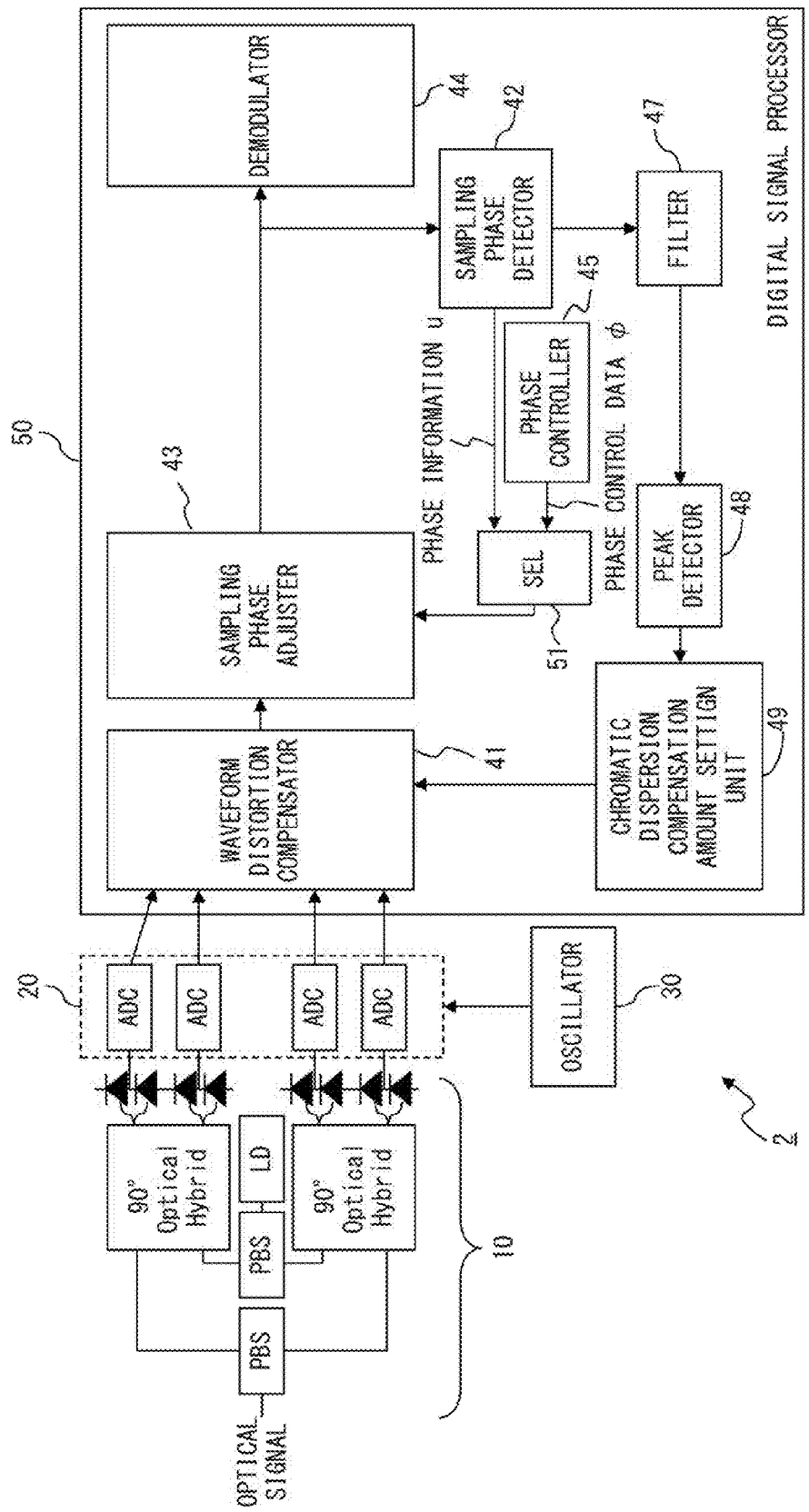
FIG. 11 is a diagram illustrating a configuration of the optical receiver of the second embodiment.

FIG. 11 is a diagram illustrating a configuration of the optical receiver of the second embodiment. The optical receiver 2 of the second embodiment includes a coherent receiver 10, an A/D converter UNIT 20, an oscillator 30, and a digital signal processor 50. The digital signal processor 50 includes a waveform distortion compensator 41, a sampling phase detector 42, a sampling phase adjuster 43, a demodulator 44, a phase controller 45, a filter 47, a peak detector 48, a chromatic dispersion compensation amount setting unit 49, and a selector 51.

In the first embodiment, a phase shifter 46 is provided between the waveform distortion compensator 41 and the sampling phase adjuster 43. The phase shifter 46 changes the sampling phase in accordance with the phase control data φ.

On the other hand, in the second embodiment, the sampling phase adjuster 43 provides a function of the phase shifter 46. In other words, the sampling phase adjuster 43 operates as the phase shifter 46 in the first embodiment during the time period of setting the waveform distortion compensator 41.

The selector 51 selects the phase control data φ generated by the phase controller 45 or the phase information u generated by the sampling phase detector 42. More specifically, the selector 51 selects the phase control data φ during the time period of determining the settings of the waveform distortion compensator 41, and selects the phase information u for the rest of the time. The digital signal processor 50 causes the selector 51 to select the phase control data φ when, for example, one of the following events occurs:

(1) the optical receiver 2 starts receiving optical signal;
(2) a signal indicating that optical paths are switched is received: and
(3) an input optical level is restored after declining to a level lower than a threshold level.

The sampling phase adjuster 43 adjusts the sampling phase in accordance with the phase control data φ when the phase control data φ is selected by the selector 51. At that time, the sampling phase adjuster 43 is provided with the phase control data φ illustrated in FIG. 6A, for example. In this case, as in the first embodiment, the sampling phase is changed within a range represented by the phase control data φ and the phase information u has a peak value. Accordingly, when the phase control data φ is selected by the selector 51, the sampling phase adjuster 43 provides a function equivalent to the function of the phase shifter 46 in the first embodiment. Meanwhile, the sampling phase adjuster 43 adjusts the sampling phase in accordance with the phase information u when the selector selects the phase information u as in the first embodiment. The sampling phase adjuster 43 is realized by, for example, an FIR filter of several taps (e.g. 5 taps). The sampling phase adjuster 43 may be realized by the configuration illustrated in FIG. 8B.

FIG. 12 is a flowchart representing a method for controlling the waveform distortion compensator 41 in the second embodiment. In the second embodiment, in step S11, the selector 51 selects the phase control data φ. Afterwards, the operations in steps S1 to S6 are substantially the same as those in the first embodiment. However, in the second embodiment, the sampling phase adjuster 43 changes the sampling phase in step S1.

When the amount of the chromatic dispersion compensation is converged (step S4: Yes), in step S12 the selector 51 selects the phase information u. Afterwards, the sampling phase adjuster 43 adjusts the sampling phase so as to minimize the phase information u.

As explained above, according to the second embodiment, the phase fluctuation is provided by using the sampling phase adjuster 43. In other words, the optical receiver 2 does not have the phase shifter 46. As a result, the circuit size of the second embodiment may be smaller than that of the first embodiment.

Although the optical receiver 2 illustrated in FIG. 11 has a configuration including the selector 51, the second embodiment is not limited to this configuration. Instead of the selector 51, for example an adder that adds the phase control data φ to the phase information u may be used. In such a case, however, "zero" is generated as the phase control data φ after completing the settings of the waveform distortion compensator 41.

Figure 13:
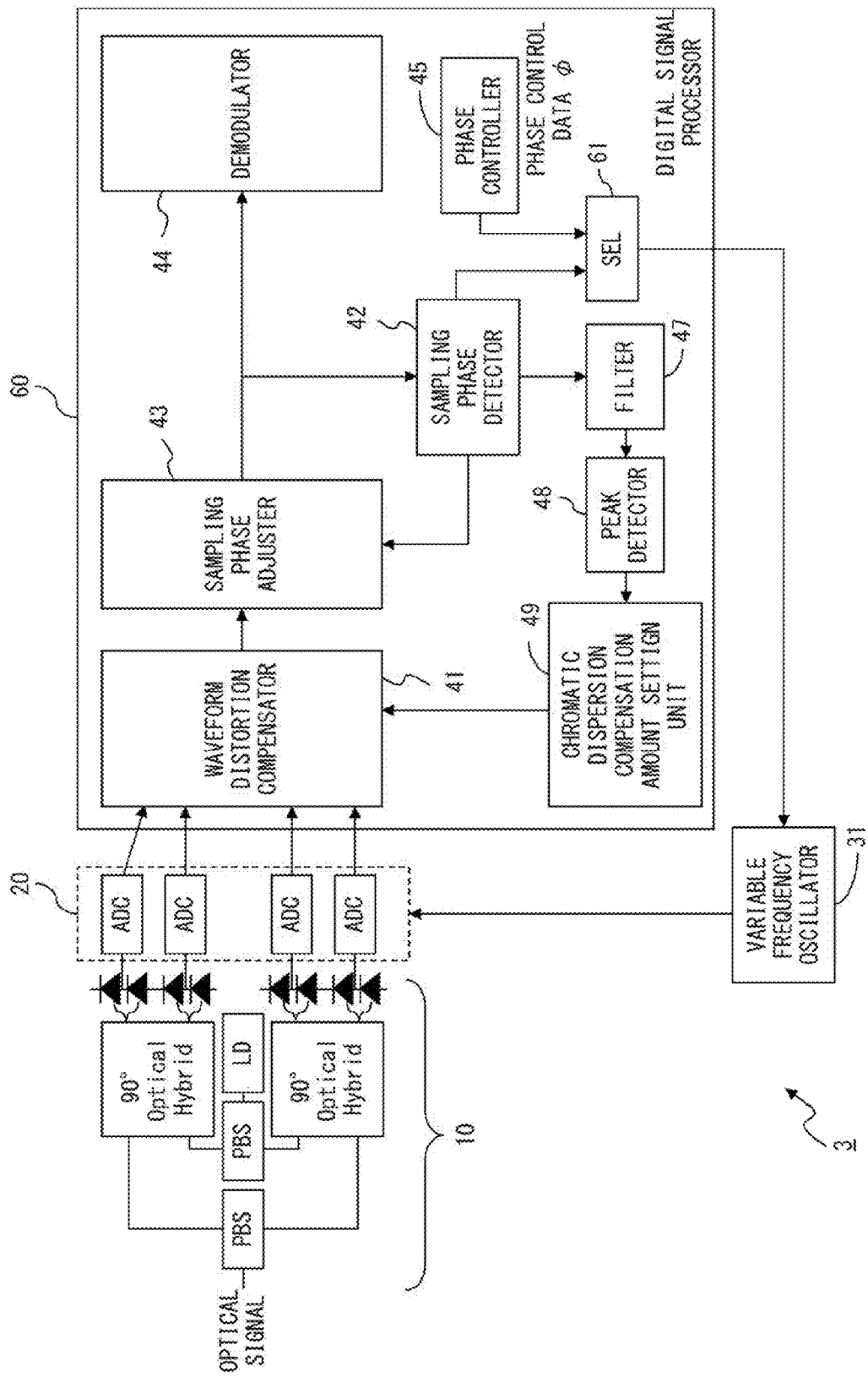
FIG. 13 is a diagram illustrating a configuration of the optical receiver of the third embodiment.

FIG. 13 is a diagram illustrating a configuration of the optical receiver of the third embodiment. An optical receiver 3 of the third embodiment includes a coherent receiver 10, an A/D converter unit 20, a variable frequency oscillator 31, and a digital signal processor 60. The digital signal processor 60 includes a waveform distortion compensator 41, a sampling phase detector 42, the sampling phase adjuster 43, a demodulator 44, a phase controller 45, a filter 47, a peak detector 48, a chromatic dispersion compensation amount setting unit 49, and a selector 61.

The selector 61, like the selector 51 in the second embodiment, selects the phase control data φ during the time period of determining the settings of the waveform distortion compensator 41, and selects the phase information u for the rest of the time. The events at which the selector 61 is switched are the same as those in the second embodiment.

The variable frequency oscillator 31 is a voltage-controlled oscillator (VCO), for example, and generates clock signal of a frequency in accordance with an instruction from the digital signal processor 60. More specifically, the variable frequency oscillator 31 generates clock signal of a frequency in accordance with the phase control data φ when the phase control data φ is selected by the selector 61. The clock signal is used as a sampling clock in the A/D converter unit 20. At that time, the phase control data φ illustrated in FIG. 6A, for example, is provided to the variable frequency oscillator 31. In this case, since the sampling phase of the A/D converter unit 20 is changed over a range represented by the phase control data φ, the phase information u passes has a peak value, as in the first or the second embodiment. Meanwhile, the variable frequency oscillator 31 generates clock signal of a frequency in accordance with the phase information u when the phase information u is selected by the selector 61.

Figure 14:
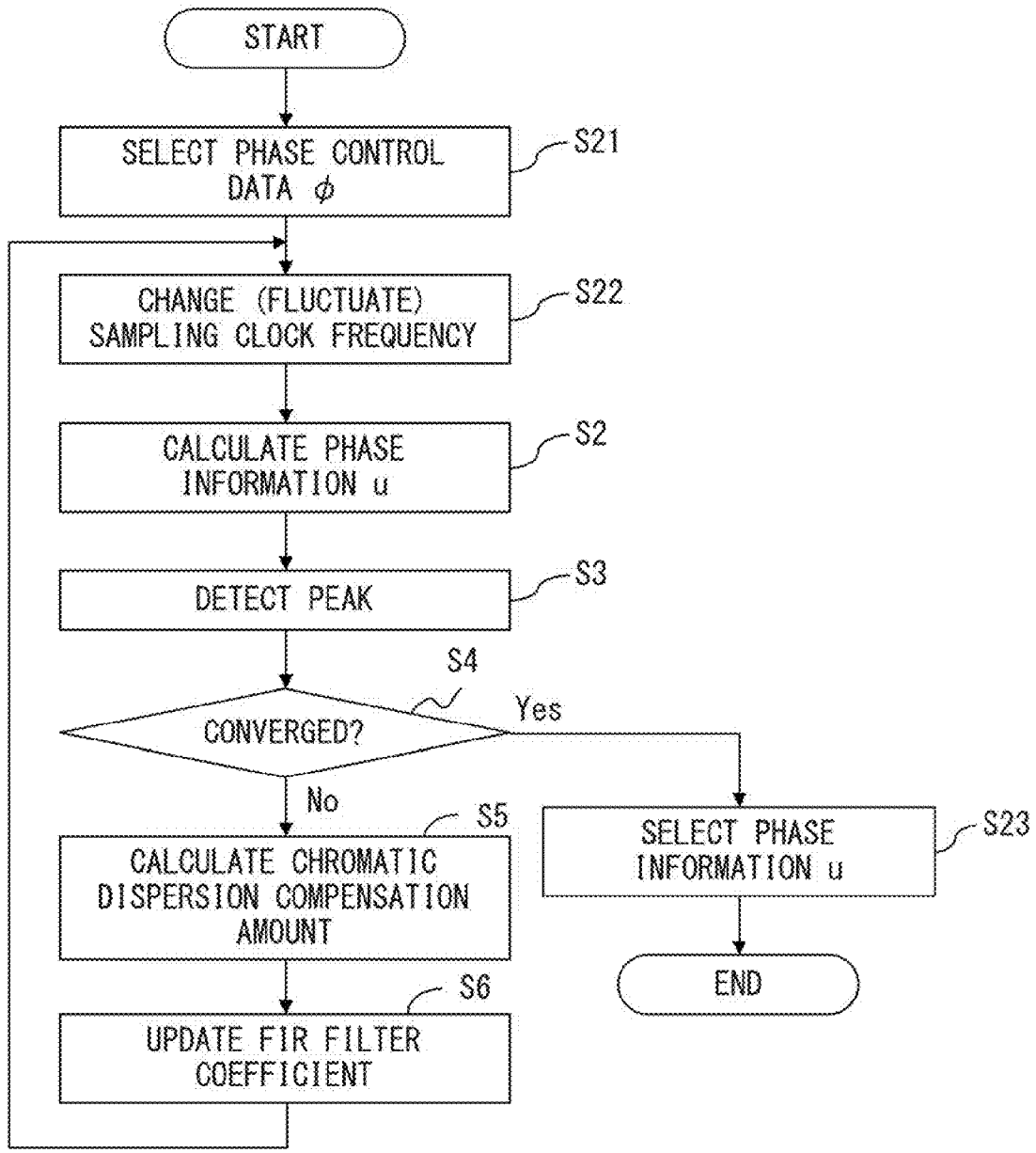
FIG. 14 is a flowchart representing a method for controlling the waveform distortion compensator in the third embodiment.

FIG. 14 is a flowchart representing a method for controlling the waveform distortion compensator 41 in the third embodiment. In the third embodiment, the selector 61 selects the phase control data φ in step S21. In step S22, the variable frequency oscillator 31 changes (fluctuates) the frequency of the sampling clock in accordance with the phase control data φ. The operations in steps S2 to S6 are substantially the same as those in the first embodiment.

When the amount of the chromatic dispersion compensation is converged (step S4: Yes), in step S23 the selector 61 selects the phase information u. Afterwards, the variable frequency oscillator 31 adjusts the oscillation frequency so as to minimize the phase information u.

As explained above, in the third embodiment, the digital signal processor 60 forcibly generates the sampling phase shift by adjusting the sampling clock frequency of the A/D converter unit 20. With this configuration also, operations substantially the same as those of the first or second embodiment is realized.

Figure 15:
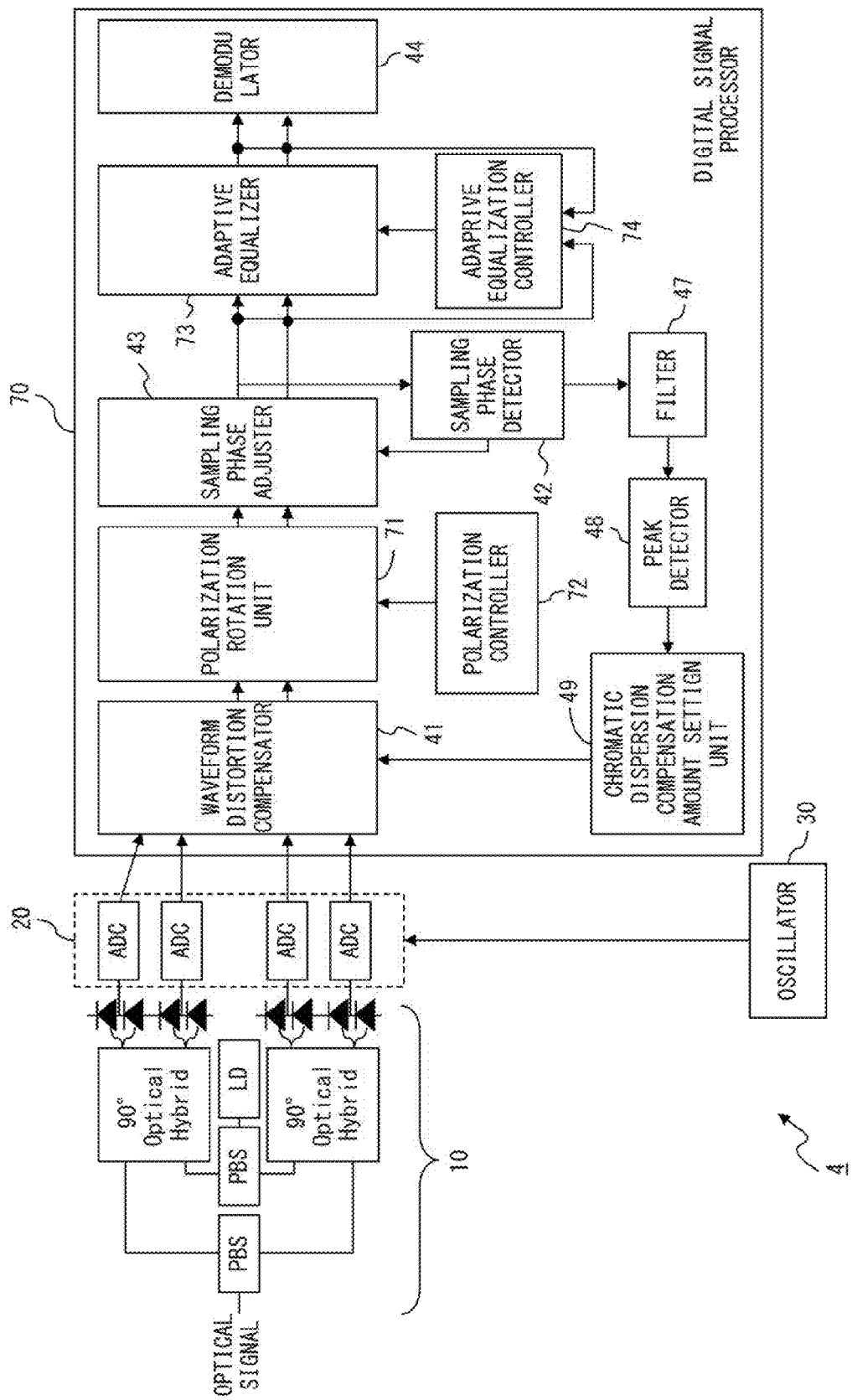
FIG. 15 is a diagram illustrating a configuration of an optical receiver of the fourth embodiment.

FIG. 15 is a diagram illustrating a configuration of an optical receiver of the fourth embodiment. An optical receiver 4 of the fourth embodiment includes a coherent receiver 10, an A/D converter unit 20, an oscillator 30, and a digital signal processor 70.

When there is a polarization mode dispersion, which causes a difference in transmission speed between two polarization modes orthogonal to one another in a transmission path, the output of the phase detector illustrated in FIG. 3A changes in accordance with the polarization direction. In a case in which the difference in delay is half of one symbol, when the optical signal enters the PBS 11 of FIG. 1 at 45° polarization angle, the output value of the sampling phase detector is reduced since the output values of each of the polarized modes cancel each other out.

In the first to third embodiments, the digital signal processor (40, 50, 60) forcibly generates a sampling phase shift so that the phase information u has a peak value by changing the sampling phase. Meanwhile, in the fourth embodiment, the digital signal processor 70 causes a state equivalent to the sampling phase shift so that the phase information u has the peak value by changing the polarization of the optical signal (actually, by executing operations to control the polarization of the optical signal on a digital signal representing the optical signal).

The digital signal processor 70 includes a waveform distortion compensator 41, a sampling phase detector 42, a sampling phase adjuster 43, a demodulator 44, a filter 47, a peak detector 48, the chromatic dispersion compensation amount setting unit 49, a polarization rotation unit 71, a polarization controller 72, an adaptive equalizer 73, and an adaptive equalization controller 74. Note that the operations of the waveform distortion compensator 41, the sampling phase detector 42, the sampling phase adjuster 43, the filter 47, the peak detector 48, and the chromatic dispersion compensation amount setting unit 49 are substantially the same as those in the first to third embodiments.

The polarization rotation unit 71 executes operations to cause the polarization of the optical signal to rotate on a digital signal output from the waveform distortion compensator 41. Here, the waveform distortion compensator 41 outputs a digital signal representing the H-polarization and the V-polarization of the optical signal in which the waveform distortion is compensated. The polarization rotation unit 71 rotates the polarization of each polarization in accordance with the polarization control data θ provided from the polarization controller 72. In other words, the polarization rotation unit 71 rotates the polarizations of the optical signal by "θ" when the polarization control data θ is provided.

The polarization controller 72 generates the polarization control data θ for controlling the rotation angle of the polarizations of the optical signal. The polarization control data θ is a function with respect to time and is represented by the following mathematical formula.

$$\theta(t) = 2\pi \int f(t) \cdot t \cdot dt$$

The polarization control data θ is represented by a sine wave, for example, as illustrated in FIG. 16. Here, when the rotation angle of the polarization changes, the phase information u detected by the sampling phase detector 42 also changes in the similar manner that the sampling phase (i.e., sampling timing) is changed. In other words, changing the rotation angle of the polarization provides similar or equivalent result on the phase information u as changing the sampling phase.

As described above, the polarization control data θ used in the fourth embodiment corresponds to the phase control data φ used in the first to third embodiments. Accordingly, the amplitude of the polarization control data θ illustrated in FIG. 16 is set so as to cause a result equivalent to the sampling timing shift corresponding to one symbol time.

The polarization rotation unit 71 rotates the polarizations of the optical signal according to the polarization control data θ. Thus, like the first embodiment, the sampling phase shift is changed over the range corresponding to one symbol, and the phase information u passes through a peak point.

The operations of the sampling phase detector 42, the peak detector 48, and the chromatic dispersion compensation amount setting unit 49 are substantially the same as those in the first to third embodiments. Therefore, the peak value of the phase information u when the rotation angle of the polarization is changed is detected. The chromatic dispersion is estimated in accordance with the detected peak value. Based on the estimated chromatic dispersion, the amount of chromatic dispersion compensation to be set in the waveform distortion compensator 41 is determined. After the setting of the waveform distortion compensator 41 is completed, the polarization rotation unit 71 is stopped.

The adaptive equalizer 73 is realized by a butterfly FIR filter, for example, illustrated in FIG. 17. The butterfly FIR filter includes four FIR filters 73hx, 73hy, 73vx, and 73vy. The FIR filters 73hx and 73hy receive a digital signal representing the H-polarization component of the optical signal, and the FIR filters 73vx and 73vy receive a digital signal representing the V-polarization component of the optical signal. Tap coefficients of the FIR filters 73hx, 73hy, 73vx, and 73vy are generated by the adaptive equalization controller 74.

The adaptive equalization controller 74 generates the tap coefficients to be provided to the FIR filters 73hx, 73hy, 73vx, and 73vy based on the digital signal sequence input to the adaptive equalizer 73 and the digital signal sequence output from the adaptive equalizer 73. At that time, the adaptive equalization controller 74 generates the tap coefficients for compensating for waveform distortion caused by the polarization fluctuation and for separating the X-polarization component from the Y-polarization component.

The demodulator 44 generates a demodulated signal from the output signal of the adaptive equalizer 73. At that time, the demodulator 44 may generate the demodulated signal by using either one of an X-polarization signal or a Y-polarization signal, or may generate the demodulated signal by using both the X-polarization signal and the Y-polarization signal. When the optical signal carries polarization-multiplexed signals, data is respectively recovered from the X-polarization signal and the Y-polarization signal.

Figure 18:
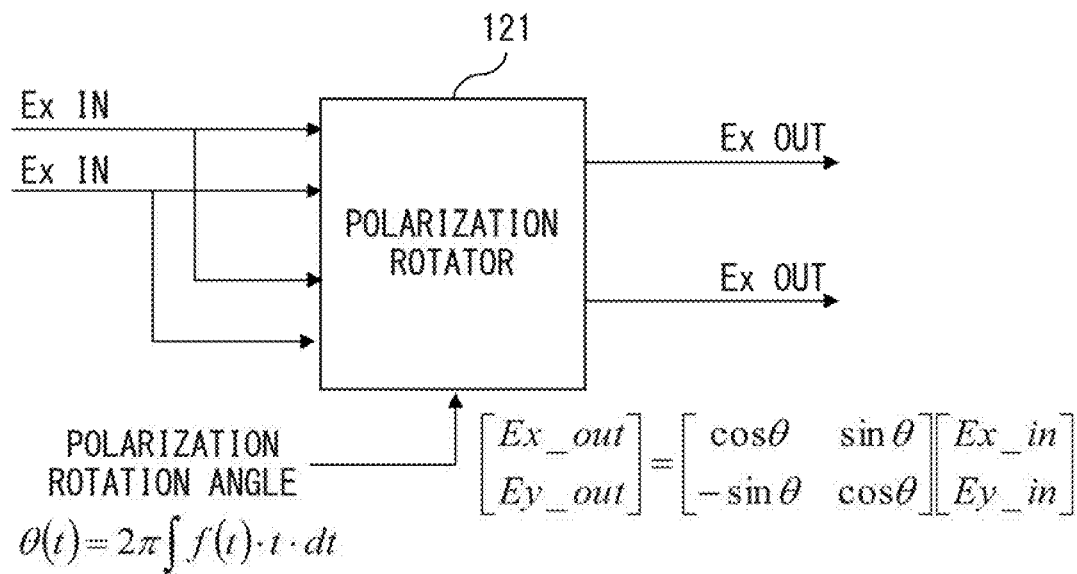
FIG. 18 is a diagram illustrating an example of the polarization rotation unit.

FIG. 18 is a diagram illustrating an example of the polarization rotation unit 71. The polarization rotation unit 71 is realized by a polarization rotator 121 in the example illustrated in FIG. 18. The polarization rotator 121 executes the operations provided in the formula below.

$$\begin{bmatrix} Ex\_out \\ Ey\_out \end{bmatrix} = \begin{bmatrix} \cos\theta & \sin\theta \\ -\sin\theta & \cos\theta \end{bmatrix} \begin{bmatrix} Ex\_in \\ Ey\_in \end{bmatrix}$$

Input signals Ex_in and Ey_in and output signals Ex_out and Ey_out of the polarization rotator 121 are represented by the following equations.

$Ex\_in = Ix + jQx$ $Ey\_in = Iy + jQy$ $Ex\_out = Ix' + jQx'$ $Ey\_out = Iy' + jQy'$ θ is a rotation angle designated by the polarization control data θ generated by the polarization controller 72, or a rotation angle calculated according to the polarization control data θ.

As described above, in the fourth embodiment, the rotation angle of the polarization (i.e., rotational frequency) is changed in a continuous manner within a specified range (e.g., +f0 to −f0). As a result, the phase information u calculated by the sampling phase detector 42 passes through a peak point. Based on the peak value of the phase information u, the amount of chromatic dispersion compensation is determined. For that reason, even if the polarization state of an optical transmission path fluctuates, the peak value of the phase information u is detected with certainty without being influenced by the fluctuation. According to the fourth embodiment, chromatic dispersion is stably estimated, and waveform distortion caused by the chromatic dispersion is accurately compensated without being influenced by the polarization state of optical transmission path.

It should be noted that in the above embodiments, the rotational frequency of the polarization continuously changes within a range of +f0 to −f0. However, the fourth embodiment is not limited to this range. In other words, +f0, 0, and −f0 may be discretely selected, or +f0 and −f0 may be discretely selected.

The polarization rotation unit 71 may be realized by a butterfly FIR filter. The operation to rotate the polarization by a desirable angle using the butterfly FIR filter has been a known technology.

Figure 19:
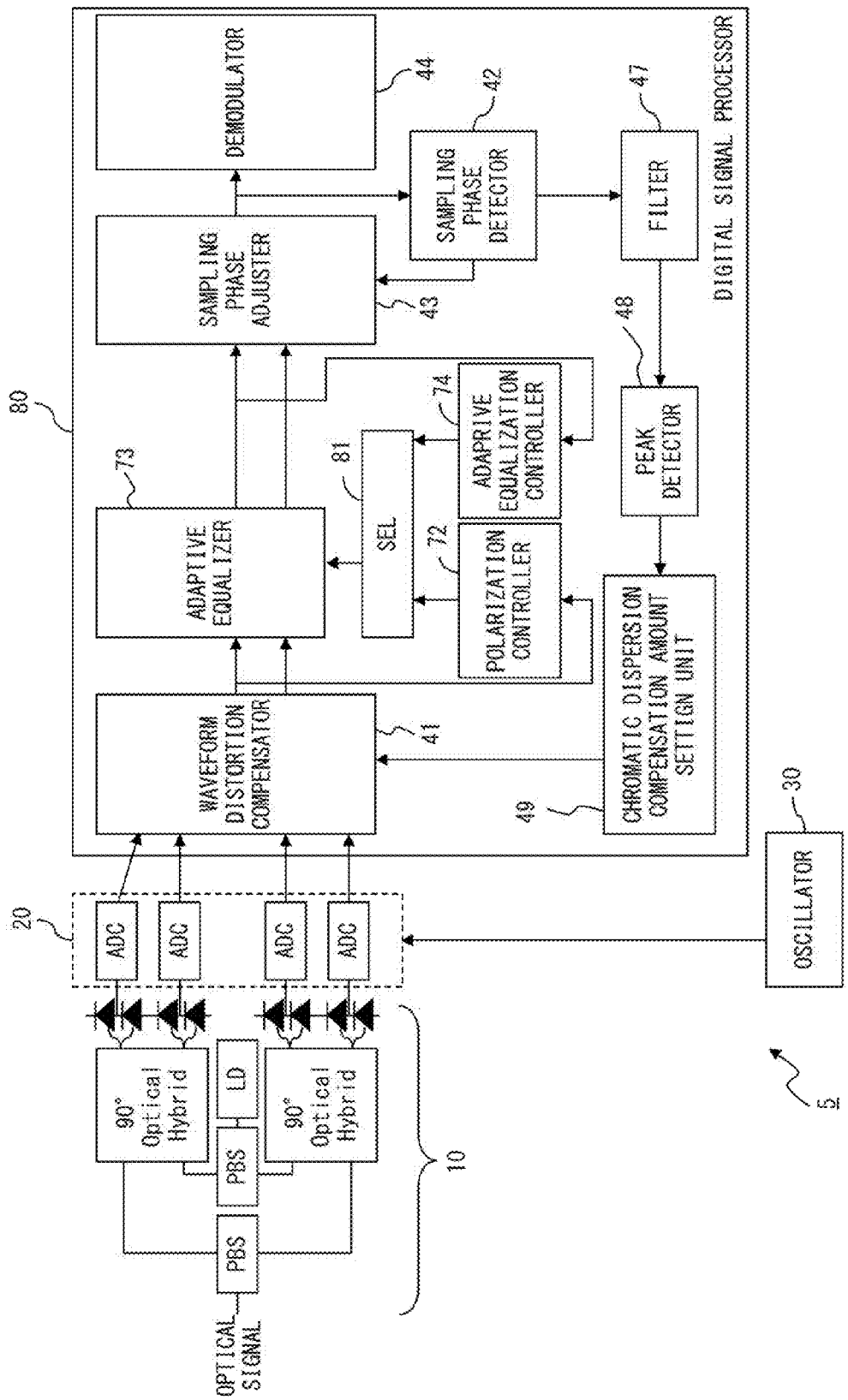
FIG. 19 is a diagram illustrating a configuration of an optical receiver of the fifth embodiment.

FIG. 19 is a diagram illustrating a configuration of an optical receiver of the fifth embodiment. The optical receiver 5 of the fifth embodiment includes a coherent receiver 10, an A/D converter UNIT 20, an oscillator 30, and a digital signal processor 80. The digital signal processor 80 includes a waveform distortion compensator 41, the sampling phase detector 42, a sampling phase adjuster 43, a demodulator 44, a filter 47, a peak detector 48, a chromatic dispersion compensation amount setting unit 49, a polarization rotation controller 72, an adaptive equalizer 73, an adaptive equalization controller 74, and a selector 81.

In the fifth embodiment, the adaptive equalizer 73 is provided between the waveform distortion compensator 41 and the sampling phase adjuster 43. The adaptive equalizer 73 executes digital operation on the output signal of the waveform distortion compensator 41 in accordance with the data selected by the selector 81.

The selector 81 selects the polarization control data θ generated by the polarization controller 72 or equalization control data generated by the adaptive equalization controller 74. The polarization control data θ corresponds to a filter coefficient for instructing the rotation angle so as to forcibly rotate the polarization so that the phase information u has the peak value, as explained in the fourth embodiment. The equalization control data corresponds to a filter coefficient for compensating for waveform distortion caused by the polarization fluctuation and for separating the X-polarization component from the Y-polarization component, as explained with reference to FIG. 17.

More specifically, the selector 81 selects the polarization control data θ during the time period of determining the settings of the waveform distortion compensator 41, and selects the equalization control data for the rest of the time. The events at which the selector 81 is switched may be the same as those in the second embodiment.

The adaptive equalizer 73 rotates the polarization in accordance with the polarization control data θ when the polarization control data θ is selected by the selector 81. In this case, as in the fourth embodiment, the adaptive equalizer 73 changes the rotation angle of the polarization over a range represented by the polarization control data θ so that the phase information u has the peak value. Accordingly, when the polarization control data θ is selected by the selector 81, the peak value of the phase information u is detected by the peak detector 48, and the amount of chromatic dispersion compensation is controlled by the chromatic dispersion compensation amount setting unit 49 based on the peak value. Meanwhile, the adaptive equalizer 73, as in the fourth embodiment, compensates for waveform distortion caused by polarization fluctuation in accordance with the equalization control data when the equalization control data is selected by the selector 81, and separates X-polarization component and Y-polarization component.

Figure 20:
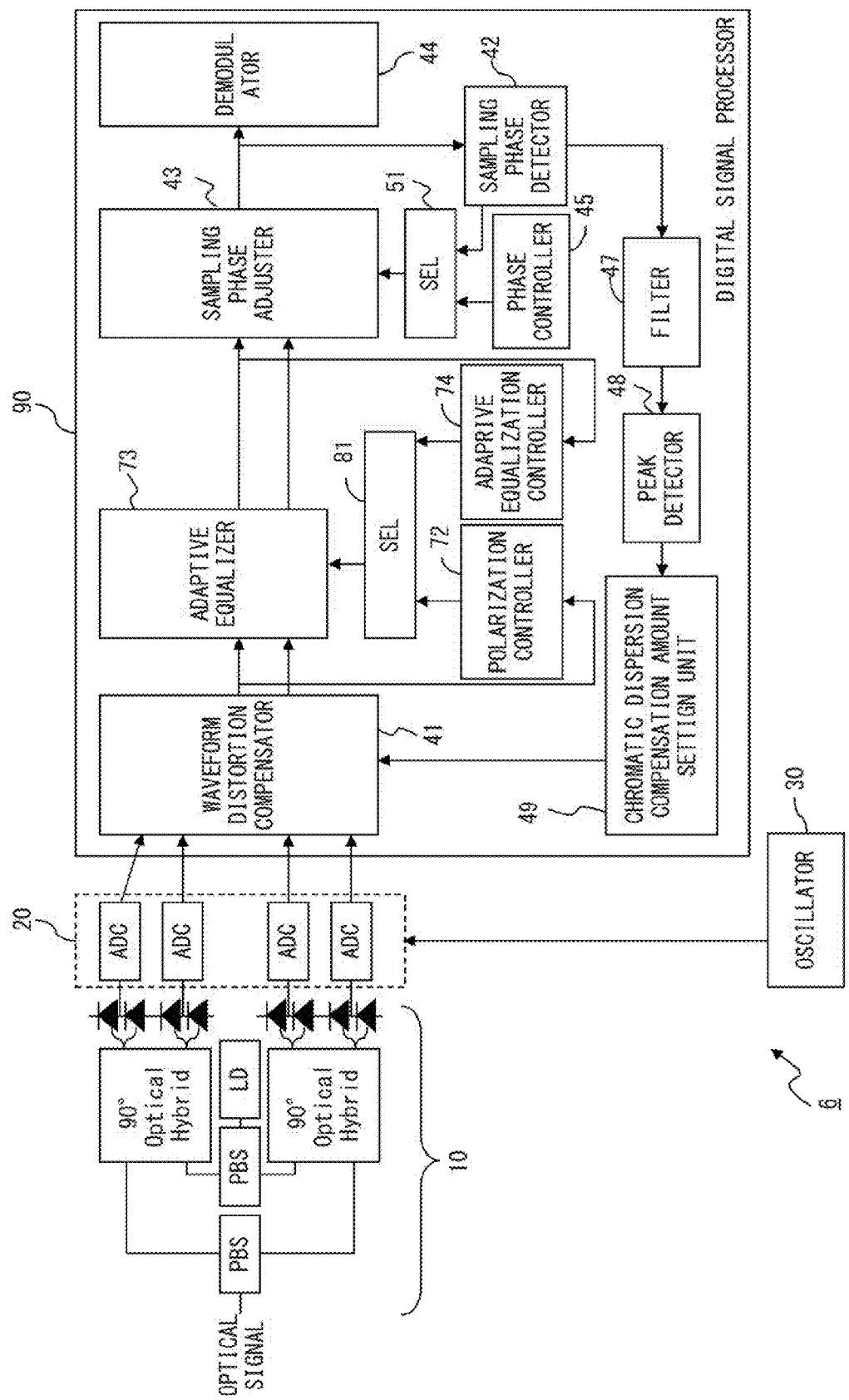
FIG. 20 is a diagram illustrating a configuration of an optical receiver of the sixth embodiment.

FIG. 20 is a diagram illustrating a configuration of an optical receiver of the sixth embodiment. An optical receiver 6 of the sixth embodiment includes a coherent receiver 10, an A/D converter unit 20, an oscillator 30, and a digital signal processor 90. The digital signal processor 90 includes a waveform distortion compensator 41, a sampling phase detector 42, a sampling phase adjuster 43, a demodulator 44, a phase controller 45, a filter 47, a peak detector 48, a chromatic dispersion compensation amount setting unit 49, a selector 51, a polarization controller 72, an adaptive equalizer 73, an adaptive equalization controller 74, and a selector 81.

The optical receiver 6 of the sixth embodiment has a configuration including the function of the second embodiment and the function of the fifth embodiment. In other words, the phase controller 45 generates the phase control data φ illustrated in FIG. 6A, for example. The polarization controller 72 generates the polarization control data θ illustrated in FIG. 16, for example. When the amount of chromatic dispersion compensation for the waveform distortion compensator 41 is determined, the selector 51 selects the phase control data φ, and the selector 81 selects the polarization control data θ. As a result, the sampling phase and the rotation angle of the polarization are controlled so that the phase information u certainly has the peak value. The changing of the sampling phase and the rotation angle of the polarization may be performed at the same time or may be alternated.

Figure 21:
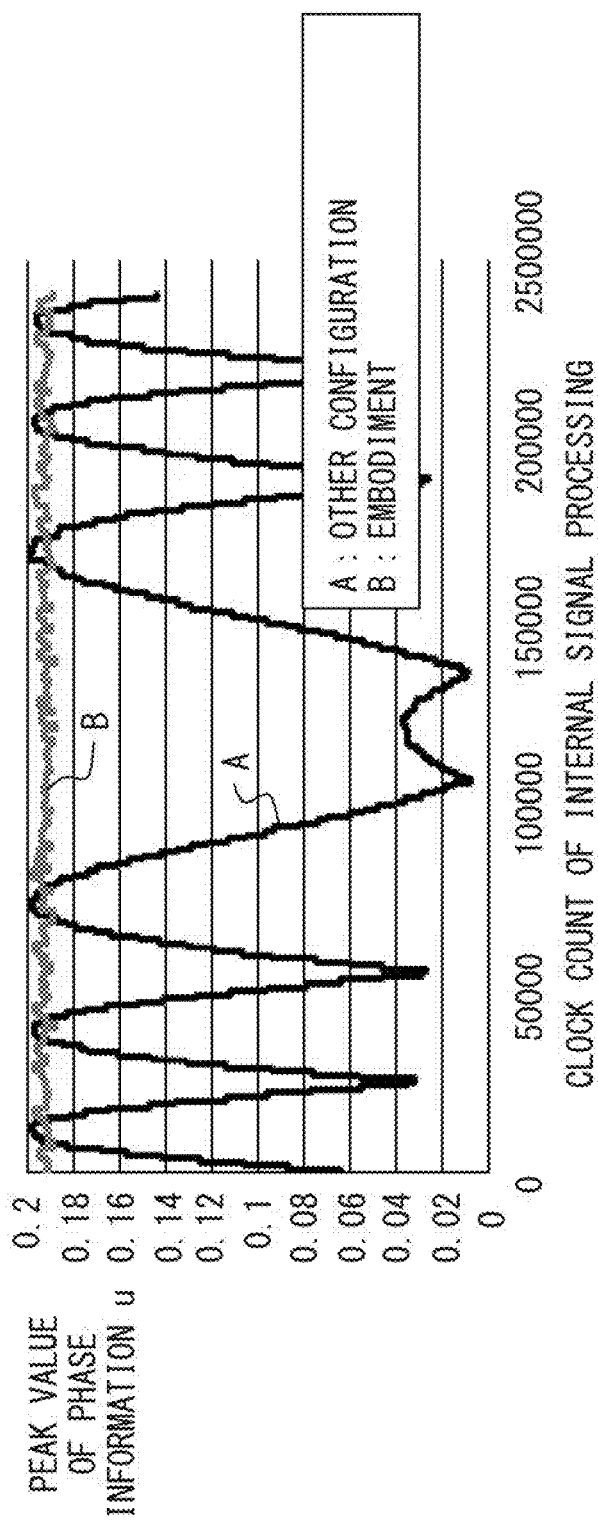
FIG. 21 is a diagram explaining the result obtained from the configurations in the first to third embodiments.

FIG. 21 is a diagram explaining the result obtained from the configurations in the first to third embodiments. In FIG. 21, the time (count of the internal clock of the digital signal processor) is plotted on the horizontal axis. One period of the internal clock is 2 nanoseconds. The peak value of the phase information u detected by the peak detector 48 is plotted on the vertical axis. The peak detector 48 detects the peak value of the phase information u in 10000 clock cycles. In this example, the frequency of the local optical source 13 has a fluctuation amplitude of 150 MHz and a fluctuation period of 1 kHz, and this causes the sampling phase shift (i.e., sampling timing error).

In a case in which the above sampling phase shift is generated, the peak value of the phase information u changes drastically, which is illustrated as A in FIG. 21, without introducing the configurations of the embodiments (i.e., without changing the sampling phase by using the phase controller 45). In such a case, it is difficult to estimate chromatic dispersion based on the peak value of the phase information u.

On the other hand, when the configuration of the embodiments is introduced (i.e., the phase controller 45 changes a sampling phase), which is illustrated as B in FIG. 21, the peak value of the phase information u is approximately constant and stable. Similarly, although it is not illustrated in the drawing, when the configuration of the embodiments is introduced, even if there is a difference (frequency offset) between the symbol rate of optical signal and the frequency of the oscillator 30, the peak value of the phase information u is approximately constant. Accordingly, when the configuration of the embodiments is introduced, it is possible to stably estimate chromatic dispersion based on the peak value of the phase information u even in a situation in which the sampling phase shift fluctuates with respect to time. As a result, the waveform distortion caused by chromatic dispersion is accurately compensated.

FIG. 22 is a diagram explaining the result obtained from the fourth and fifth embodiments. The horizontal and vertical axes in FIG. 22 are the same as those in FIG. 21. In FIG. 22, the polarization of optical signal fluctuates with 1 kHz, and this causes the sampling phase shift.

When the above polarization fluctuation occurs, the peak value of the phase information u periodically fluctuates, which is illustrated as C in FIG. 22, without introducing the configuration of the embodiments (i.e., without changing the rotation angle of the polarization by using the polarization controller 72). In such a case, it is difficult to estimate chromatic dispersion based on the peak value of the phase information u.

On the other hand, when the configuration of the embodiments is introduced (i.e., the polarization controller 72 changes a sampling phase), which is illustrated as D in FIG. 22, the peak value of the phase information u is approximately constant and stable. Accordingly, when the configuration of the embodiments is introduced, it is possible to stably estimate chromatic dispersion based on the peak value of the phase information u even in a situation in which the polarization fluctuates. As a result, the waveform distortion caused by chromatic dispersion may be accurately compensated.

According to the method of the embodiments, compared with the method for determining the amount of chromatic dispersion compensation so as to minimize the number of error corrections of the demodulated signal, the time required for estimating the chromatic dispersion is reduced. Therefore, according to the method of the embodiments, the required for system recovery is reduced in, for example, a communication system in which optical paths are switched when a failure occurs.

In the above first to sixth embodiments, the phase information u has the peak value by changing the sampling phase or the rotation angle of polarization. However, the optical receivers according to the present embodiments may fluctuate the phase information u by using other methods. At that time, it is preferable that the digital signal processor cause one period or more fluctuation in the phase information u. "One period" is the same as the one period explained with reference to FIG. 4.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has(have) been described in detail, it should be understood that the various changes, substitutions, and alterations could be made hereto without departing from the spirit and scope of the invention.

What is claimed is:

1. An optical receiver comprising:
    a coherent receiver to receive an optical signal;
    an A/D converter to convert an output signal of the coherent receiver into a digital signal representing the optical signal;
    a waveform distortion compensator to perform an operation on the digital signal to compensate for waveform distortion of the optical signal;
    a phase detector to generate phase information representing a sampling phase of the A/D converter;
    a phase adjuster to generate a digital signal representing an optical signal in which the sampling phase of the A/D converter is adjusted from an output signal of the waveform distortion compensator using the phase information;
    a demodulator to generate a demodulated signal from the output signal of the phase adjuster;
    a phase controller to control the sampling phase of the A/D converter;
    a peak detector to detect a peak value of the phase information while the sampling phase of the A/D converter is controlled by the phase controller; and
    a compensation controller to control the waveform distortion compensator using the peak value.

2. The optical receiver according to claim 1, further comprising:
    a phase shifter provided between the waveform distortion compensator and the phase adjuster to change the sampling phase by performing a digital operation on the output signal of the waveform distortion compensator according to control data from the phase controller.

3. The optical receiver according to claim 1, wherein
    the phase adjuster changes the sampling phase in accordance with control data from the phase controller when the compensation controller controls the waveform distortion compensator.

4. The optical receiver according to claim 3, further comprising
    a selector to select the control data generated by the phase controller when the compensation controller controls the waveform distortion compensator, and to select the phase information generated by the phase detector after the compensation controller controls the waveform distortion compensator,
    wherein the phase adjuster adjusts the sampling phase in accordance with the control data or the phase information selected by the selector.

5. The optical receiver according to claim 3, wherein
    the phase adjuster changes the sampling phase by performing a digital operation on the output signal of the waveform distortion compensator according to the control data from the phase controller.

6. The optical receiver according to claim 3, further comprising
    an adder to add the control data generated by the phase controller to the phase information generated by the phase detector,
    wherein the phase adjuster adjusts the sampling phase in accordance with an output of the adder.

7. The optical receiver according to claim 6, wherein
    the phase controller outputs zero as the control data after the compensation controller controls the waveform distortion compensator.

8. The optical receiver according to claim 1, further comprising
a variable frequency oscillator to generate a sampling clock used by the A/D converter,
wherein the variable frequency oscillator changes a frequency of the sampling clock in accordance with control data from the phase controller when the compensation controller controls the waveform distortion compensator.

9. The optical receiver according to claim 1, wherein
the phase controller changes the sampling phase of the A/D converter within a phase range corresponding to one symbol period of the optical signal or a period larger than the one symbol period.

10. The optical receiver according to claim 1, wherein
the A/D converter generates a digital signal sequence representing the optical signal by sampling at a speed twice a symbol rate of the optical signal, and
the phase detector generates the phase information by multiplying a difference between a first digital signal and a third digital signal of three consecutive digital signals by a second digital signal.

11. An optical receiver comprising:
a coherent receiver to receive an optical signal;
an A/D converter to convert an output signal of the coherent receiver into a digital signal representing the optical signal;
a waveform distortion compensator to perform an operation on the digital signal to compensate for waveform distortion of the optical signal;
a phase detector to generate phase information representing a sampling phase of the A/D converter;
a phase adjuster to generate a digital signal representing an optical signal in which the sampling phase of the A/D converter is adjusted from an output signal of the waveform distortion compensator using the phase information;
a demodulator to generate a demodulated signal from the output signal of the phase adjuster;
a polarization controller to control a rotation angle of polarization of the optical signal;
a peak detector to detect a peak value of the phase information while the polarization of the optical signal is controlled by the polarization controller; and
a compensation controller to control the waveform distortion compensator using the peak value.

12. The optical receiver according to claim 11 further comprising
an adaptive equalizer provided between the waveform distortion compensator and the phase adjuster to perform an operation on the output signal of the waveform distortion compensator to control the polarization of the optical signal,
wherein the adaptive equalizer controls the polarization in accordance with control data from the polarization controller when the compensation controller controls the waveform distortion compensator.

13. An optical receiver comprising:
a coherent receiver to receive an optical signal;
an A/D converter to convert an output signal of the coherent receiver into a digital signal representing the optical signal;
a waveform distortion compensator to perform operation on the digital signal to compensate for waveform distortion of the optical signal;
a phase detector to generate phase information representing a sampling phase of the A/D converter;
a phase adjuster to generate a digital signal representing an optical signal in which the sampling phase of the A/D converter is adjusted from an output signal of the waveform distortion compensator using the phase information;
a demodulator to generate a demodulated signal from the output signal of the phase adjuster;
a fluctuation controller to fluctuate the phase information by one period or more;
a peak detector to detect a peak value of the phase information while the phase information is controlled by the fluctuation controller; and
a compensation controller to control the waveform distortion compensator using the peak value.

14. A digital signal processor used in an optical receiver including a coherent receiver to receive an optical signal and an A/D converter to convert an output signal of the coherent receiver into a digital signal representing the optical signal, comprising:
a waveform distortion compensator to perform operation on the digital signal to compensate for waveform distortion of the optical signal;
a phase detector to generate phase information representing a sampling phase of the A/D converter;
a phase adjuster to generate a digital signal representing an optical signal in which the sampling phase of the A/D converter is adjusted from an output signal of the waveform distortion compensator using the phase information;
a demodulator to generate a demodulated signal from the output signal of the phase adjuster;
a phase controller to control the sampling phase of the A/D converter;
a peak detector to detect a peak value of the phase information while the sampling phase of the A/D converter is controlled by the phase controller; and
a compensation controller to control the waveform distortion compensator using the peak value.

15. A digital signal processor used in an optical receiver including a coherent receiver to receive an optical signal and an A/D converter to convert an output signal of the coherent receiver into a digital signal representing the optical signal, comprising:
a waveform distortion compensator to perform an operation on the digital signal to compensate for waveform distortion of the optical signal;
a phase detector to generate phase information representing a sampling phase of the A/D converter;
a phase adjuster to generate a digital signal representing an optical signal in which the sampling phase of the A/D converter is adjusted from an output signal of the waveform distortion compensator using the phase information;
a demodulator to generate a demodulated signal from the output signal of the phase adjuster;
a polarization controller to control a rotation angle of polarization of the optical signal;
a peak detector to detect a peak value of the phase information while the polarization of the optical signal is controlled by the polarization controller; and
a compensation controller to control the waveform distortion compensator using the peak value.

* * * * *